(12) United States Patent
Comeau

(10) Patent No.: US 12,087,094 B2
(45) Date of Patent: Sep. 10, 2024

(54) METHODS AND SYSTEMS FOR HUMAN MOTION CAPTURE

(71) Applicant: KINETISENSE INC., Medicine Hat (CA)

(72) Inventor: Ryan Daniel Comeau, Desert Blume (CA)

(73) Assignee: Kinetisense Inc., Medicine Hat (CA)

( * ) Notice: Subject to any disclaimer, the term of this patent is extended or adjusted under 35 U.S.C. 154(b) by 0 days.

(21) Appl. No.: 18/421,065

(22) Filed: Jan. 24, 2024

(65) Prior Publication Data

US 2024/0265734 A1    Aug. 8, 2024

Related U.S. Application Data

(60) Provisional application No. 63/443,750, filed on Feb. 7, 2023.

(51) Int. Cl.
| | | |
|---|---|---|
| G06V 40/00 | (2022.01) | |
| G06K 9/00 | (2022.01) | |
| G06V 20/64 | (2022.01) | |
| G06V 40/20 | (2022.01) | |
| G06V 20/40 | (2022.01) | |

(52) U.S. Cl.
CPC ............ G06V 40/23 (2022.01); G06V 20/647 (2022.01); *G06V 20/42* (2022.01)

(58) Field of Classification Search
CPC ....... G06V 40/23; G06V 20/647; G06V 20/42
See application file for complete search history.

(56) References Cited

U.S. PATENT DOCUMENTS

| | | |
|---|---|---|
| 7,257,237 B1 | 8/2007 | Luck et al. |
| 8,644,552 B2 | 2/2014 | Han et al. |
| 9,154,739 B1 | 10/2015 | Nicolaou et al. |
| 9,355,305 B2 | 5/2016 | Tanabiki et al. |
| 11,331,006 B2 | 5/2022 | Gingrich et al. |
| 2020/0342270 A1* | 10/2020 | Biswas ................ G06V 40/103 |
| 2020/0401793 A1* | 12/2020 | Leung .................. G06V 10/147 |

(Continued)

OTHER PUBLICATIONS

Document received in relation to PCT Application No. PCT/CA2024/050077 mailed on Apr. 19, 2024 (International Search Report and Written Opinion), 10 pages.

(Continued)

*Primary Examiner* — David F Dunphy
(74) *Attorney, Agent, or Firm* — Bennett Jones LLP

(57) ABSTRACT

Embodiments herein generally relate to methods and systems for human motion capture. In at least one embodiment, there is disclosed a method comprising: accessing one or more input 2D image frames of a subject performing a physical activity, wherein for each input 2D image frame, automatically: detecting one or more image portions corresponding to the subject's joints; identifying one or more pre-defined anchors in the image frame; processing the input 2D image frame to generate a modified input 2D image frame by: overlaying a bounding box and one or more reference axis lines over the input 2D image frame to generate the modified 2D image frame; resolving values for the one or more joint-specific angles generated by the intersection of the one or more reference axis lines; applying a joint coupling model to the determine relative joint positions, of the subject's joints, in a transverse and sagittal planes.

20 Claims, 13 Drawing Sheets

(56) References Cited

U.S. PATENT DOCUMENTS

2021/0241522 A1\* 8/2021 Guler .................... G06V 10/82
2022/0198834 A1\* 6/2022 Fujimoto ............ G06V 10/803

OTHER PUBLICATIONS

Wade, Logan et al, "Examination of 2D frontal and sagittal markerless motion capture: Implications for markerless applications", Nov. 9, 2023, 16 pages, vol. 18, Plos One.

Khalil, Hisham et al, "Human Motion Retargeting to Pepper Humanoid Robot from Uncalibrated Videos Using Human Pose Estimation", Aug. 8-12, 2021, 8 pages, 30th IEEE International Conference on Robot and Human Interactive Communication (RO-MAN).

Itokazu, Masafumi, "Reliability and accuracy of 2D lower limb joint angles during a standing-up motion for markerless motion analysis software using deep learning." Dec. 2022, 5 pages, vol. 16, Medicine in Novel Technology and Devices.

Schurr, Stacey A "Two-Dimensional Video Analysis is Comparable to 3D Motion Capture in Lower Extremity Movement Assessment", 10 pages, vol. 12,2, International Journal of Sports Physical Therapy.

Van Crombrugge, Izaak, et al "Accuracy Assessment of Joint Angles Estimated from 2D and 3D Camera Measurements.", 15 pages, Feb. 23, 2022, vol. 22,5, Sensors.

\* cited by examiner

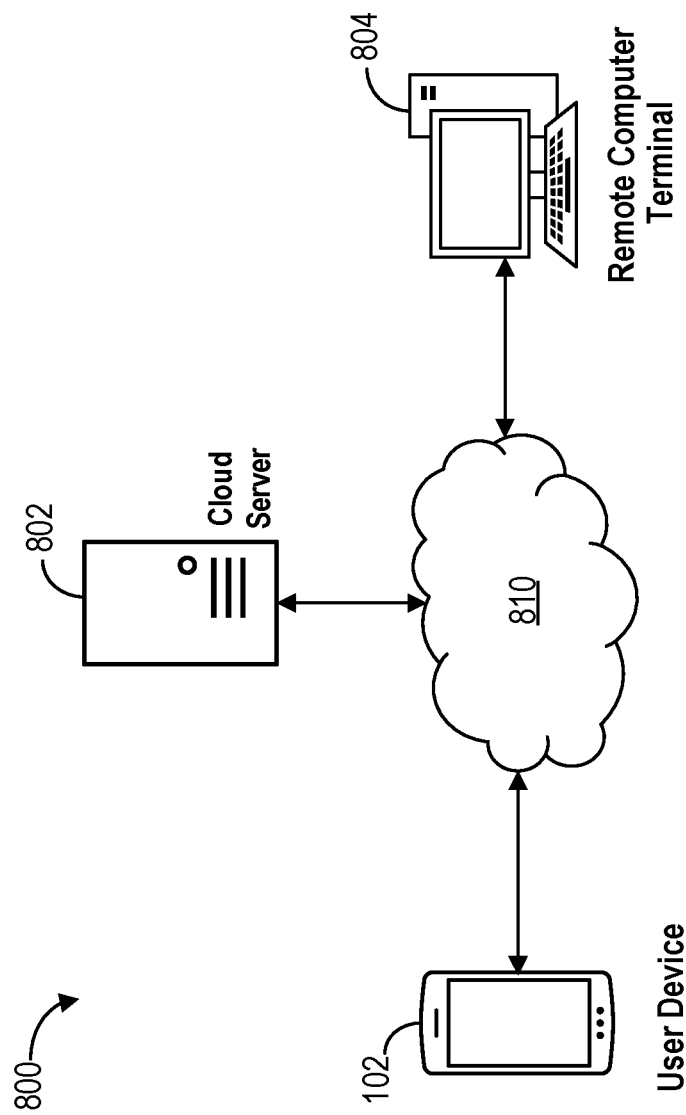

METHODS AND SYSTEMS FOR HUMAN MOTION CAPTURE

CROSS-REFERENCE TO RELATED APPLICATION(S)

This application claims the benefit of priority to U.S. Provisional Application No. 63/443,750 filed on Feb. 7, 2023, the entire contents of which are incorporated herein by reference in its entirety.

FIELD

Various embodiments are described herein that generally relate to motion capture technology, and in particular, to methods and systems for human motion capture, including real-time, or near real-time human motion capture.

BACKGROUND

There has been an increasing effort, in recent years, to develop enhanced human motion capture technology that can better track human joint positions for a range of dynamic motions and static postures. Such technology finds increasing relevance in a wide variety of fields, including for biomechanical assessments.

SUMMARY OF VARIOUS EMBODIMENTS

According to one broad aspect, there is provided a method for human motion capture, comprising: analyzing a two-dimensional (2D) image frame of a subject to detect one or more image portions corresponding to the subject's joints; defining a capture area based on one or more pre-defined anchors, identified in the image frame, wherein the capture area defines an image area surrounding the one or more image portions of the subject's joints, and the capture area defines at least left and right parallel vertical lines; generating one or more reference axis lines within the capture area, and which intersect the vertical lines; determining one or more joint-specific angles generated by the intersection of the one or more reference axis lines, with the vertical lines; based on the determined joint-specific angle values, applying a joint coupling model to the determine relative joint positions, of the subject's joints, in a transverse and sagittal planes; and generating an output indicating three-dimensional (3D) joint position data for the subject's joints.

In some embodiments, the method further comprises: initially, operating a two dimensional (2D) image sensor to capture the input 2D image frame.

In some embodiments, the method is performed in real-time, or near real-time, based on a real-time or near real-time input feed of 2D image frames.

In some embodiments, the one or more pre-defined anchors comprise one or more of: the image portions corresponding to the ankle joints; and a detected vertical midline axis of the subject.

In some embodiments, the capture area is a re-adjustable bounding box that further includes parallel horizontal lines connecting the vertical lines.

In some embodiments, the output comprises a graphical output of three-dimensional (3D) joint position data in one or more of the frontal, transverse and sagittal planes.

In some embodiments, the method further comprises: initially identifying one or more activity-specific rules, corresponding to a selected activity type; comparing the output 3D joint position data to the one or more activity-specific rules to determine a match; and if there is no match, generating the output to indicate that the activity type is performed incorrectly.

In some embodiments, the one or more reference axis lines comprise: (a) one or more cross-diagonal axis lines, extending between the vertical lines; and (b) one or more joint-intersecting lines, extending and intersecting image portions corresponding to same joint types.

In some embodiments, the one or more reference axis lines generate a plurality of triangular areas within, each triangular area being associated with a corresponding joint-specific angle, and wherein determining one or more joint-specific angles involves applying a triangulation model to the triangular areas.

In some embodiments, the method further comprises comparing a change of joint-specific angles between the opposite joints, as between subsequent 2D image frames, to determine a change of movement in the transverse and sagittal planes.

In some embodiments, the method further comprises: initially, operating a three dimensional (3D) image sensor to capture the one or more input 3D image data.

In some embodiments, the output 3D joint position data comprises first output 3D joint position data, and the method further comprising: analyzing input 3D image data to determine second output 3D joint position data, wherein the input 3D image data is captured of the subject concurrently with the input 2D image frames; and combining the first and second output 3D joint position data to generate a combined output 3D joint position data.

In another broad aspect, there is provided a system for human motion capture, comprising: a two-dimensional (2D) image sensor; and at least one processor coupled to the 2D image sensor, and configured for: analyzing a two-dimensional (2D) image frame of a subject, captured by the 2D image sensor, to detect one or more image portions corresponding to the subject's joints; defining a capture area based on one or more pre-defined anchors, identified in the image frame, wherein the capture area defines an image area surrounding the one or more image portions of the subject's joints, and the capture area defines at least left and right parallel vertical lines; generating one or more reference axis lines within the capture area, and which intersect the vertical lines; determining one or more joint-specific angles generated by the intersection of the one or more reference axis lines, with the vertical lines; based on the determined joint-specific angle values, applying a joint coupling model to the determine relative joint positions, of the subject's joints, in a transverse and sagittal planes; and generating an output indicating three-dimensional (3D) joint position data for the subject's joints.

In some embodiments, the at least one processor being further configured for: initially, operating a two dimensional (2D) image sensor to capture the input 2D image frame.

In some embodiments, the one or more pre-defined anchors comprise one or more of: the image portions corresponding to the ankle joints; and a detected vertical midline axis of the subject.

In some embodiments, the capture area is a re-adjustable bounding box that further includes parallel horizontal lines connecting the vertical lines.

In some embodiments, the output comprises a graphical output of three-dimensional (3D) joint position data in one or more of the frontal, transverse and sagittal planes.

In some embodiments, the at least one processor is further configured for: initially identifying one or more activity-specific rules, corresponding to a selected activity type;

comparing the output 3D joint position data to the one or more activity-specific rules to determine a match; and if there is no match, generating the output to indicate that the activity type is performed incorrectly.

In some embodiments, the one or more reference axis lines comprise: (a) one or more cross-diagonal axis lines, extending between the vertical lines; and (b) one or more joint-intersecting lines, extending and intersecting image portions corresponding to same joint types.

In some embodiments, the one or more reference axis lines generate a plurality of triangular areas within, each triangular area being associated with a corresponding joint-specific angle, and wherein determining one or more joint-specific angles involves applying a triangulation model to the triangular areas.

In some embodiments, the at least one processor is further configured for: comparing a change of joint-specific angles between the opposite joints, as between subsequent 2D image frames, to determine a change of movement in the transverse and sagittal planes.

In some embodiments, the system further comprising a three-dimensional (3D) image sensor coupled to the at least one processor, and the at least one processor is further configured for: initially, operating the 3D image sensor to capture the one or more input 3D image data.

In some embodiments, the output 3D joint position data comprises first output 3D joint position data, and the at least one processor is further configured for: analyzing input 3D image data to determine second output 3D joint position data, wherein the input 3D image data is captured of the subject concurrently with the input 2D image frames; and combining the first and second output 3D joint position data to generate a combined output 3D joint position data.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 8 is an example system used for human motion capture, according to some other example embodiments.

Figure 1:
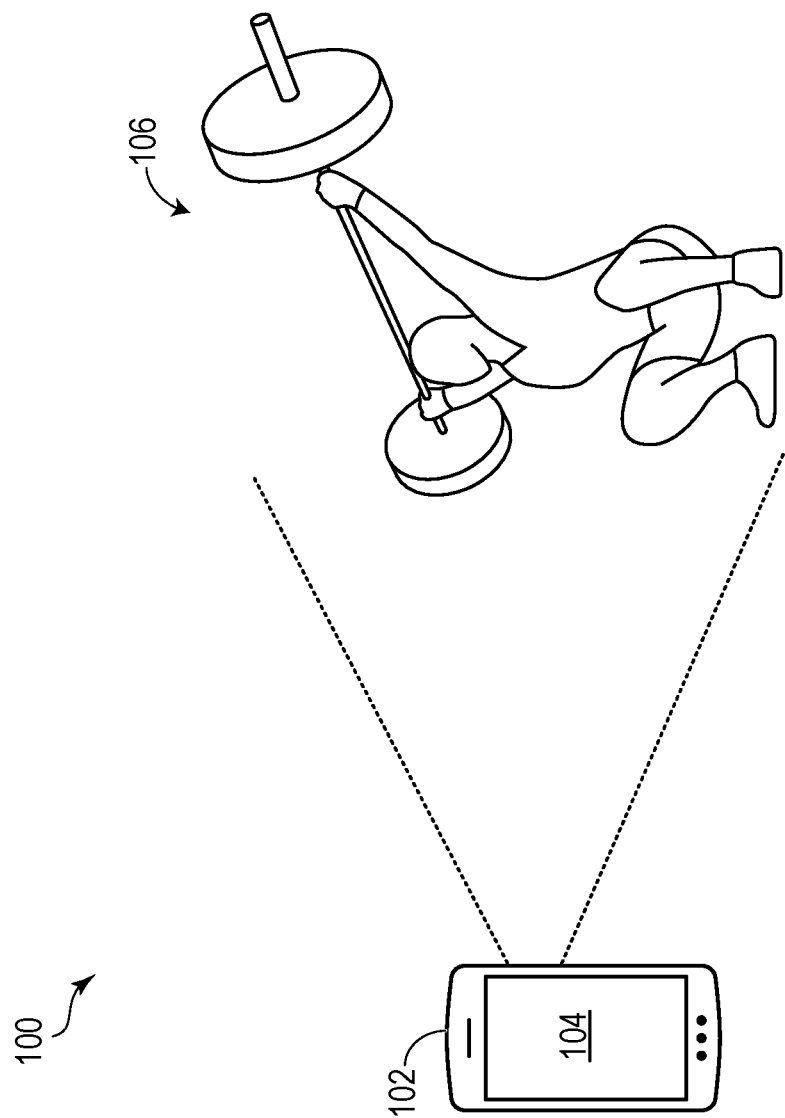
FIG. 1 is an example environment for human motion capture.

Further aspects and features of the example embodiments described herein will appear from the following description taken together with the accompanying drawings.

DESCRIPTION OF VARIOUS EMBODIMENTS

As discussed in the background, in recent years, human motion capture technology has found increasing relevance in a wide variety of fields.

For example, in rehabilitation and sports applications, motion capture is used for biomechanical assessment and feedback. For instance, this includes using motion capture to detect movement dysfunctions, e.g., identify compensatory movement patterns. In turn, practitioners can rely on this technology to correct a subject's physical movements, identify injuries, or otherwise develop early injury prevention strategies that minimize or limit risk of injury.

Similarly, in workplace environments, motion capture technology is applied to monitor employees performing manual labor tasks (e.g., lifting objects). In particular, motion capture can allow tracking and early-detection of physical movements that are prone to cause workplace injuries.

More generally, motion capture systems have been deployed in various other applications including, most commonly, in the entertainment and gaming industries (e.g., XBOX® Kinect®).

Existing methods for motion capture, however, suffer from a number of distinct drawbacks. For instance, many existing motion capture systems rely on three-dimensional (3D) sensors. The use of 3D sensors is necessary to quantify and track human motion in all three movement planes (e.g., frontal, sagittal and transverse planes).

Yet, many electronic devices—including many conventional user devices (e.g., phones, tablets and the like)—are not equipped with 3D sensors. These devices are often equipped with only two-dimensional (2D) cameras, which do not enable tri-planar motion tracking. Accordingly, in many cases, use of motion capture technology is limited to settings where 3D sensing technology is made available. For example, performance of biomechanical assessments is typically limited to clinical settings which are equipped with 3D imaging devices. In turn, biomechanical assessments cannot be conducted remotely or virtually (e.g., telehealth assessments), or otherwise, outside of clinical settings.

To date, some motion capture systems have attempted to work around the requirement for 3D sensors by using multiple 2D cameras. The multiple 2D cameras are positioned around the subject, and at different angled perspectives. In this manner, 2D images—from the multiple cameras—are combined, and stitched together to generate a 3D visualization of the subject. As such, the multiple cameras enable tri-planar motion tracking.

Still, many individuals do not have ready access to multiple connected cameras at home, or outside of clinical settings. Further, these systems require detailed set-up configurations to ensure that that cameras are accurately positioned around the subject.

More broadly, many existing motion capture systems are unable to monitor human motion in "true" real-time or near real-time, despite being advertised as such. This is because these systems rely on computationally expensive algorithmic models for body joint tracking, and which otherwise require significant processing delay and memory resources. This is especially true of systems which rely on algorithms that combine and stitch together multiple images generated by multiple 2D cameras, surrounding a subject.

In view of the foregoing, embodiments herein generally relate to methods and systems for human motion capture using two-dimensional (2D) image sensors.

In at least one embodiment, the disclosed systems and methods enable "marker-less" joint tracking using only a single 2D imaging sensor. The output of the 2D sensor is projected into three-dimensions to provide for tri-planar body joint and motion tracking.

As compared to existing systems, the joint tracking can be performed with lower processing power, and minimal computational delay. In turn, this allows the system to provide truer real-time or near real-time tracking, at least for some example applications.

In at least one example, the disclosed embodiments facilitate biomechanical assessment and feedback, outside of clinical settings. For example, a user device—equipped with only a 2D camera—may host a biomechanics assessment application. The user may direct to face the user device's camera while performing a physical activity. The biomechanics application is then operated to analyze the 2D image frames in order to track 3D joint position, as the user performs the activity. The application then outputs feedback in respect of whether the activity was performed correctly. In some examples, this feedback is also provided in real-time or near real-time.

As also provided herein, the disclosed systems and methods can be used in conjunction with 3D motion capture. For instance, as explained below, the disclosed embodiments can enhance the accuracy output of 3D motion capture technology.

I. GENERAL DESCRIPTION

Reference is now made to FIG. 1, which is an example environment (100) in which the methods and systems herein can be deployed.

As shown, environment (100) includes a user device (102). User device (102) is associated with a subject (106), or any other third-party (e.g., an assessment practitioner). In some examples, user device (102) is a phone, a tablet, or the like.

More generally, user device (102) enables capturing and tracking of the subject's tri-planer joint positions (e.g., in the frontal, sagittal and transverse planes). In some examples, user device (102) monitors tri-planar joint positions as the user performs a physical motion, e.g., an exercise or physical task. For instance, in the illustrated example, the subject (106) is performing a dumbbell overhead squat. In other examples, the subject (106) may not be performing a dynamic motion, but may be in a static posture. In these examples, the user device (102) monitors joint positions to assess static posture form.

Figure 9:
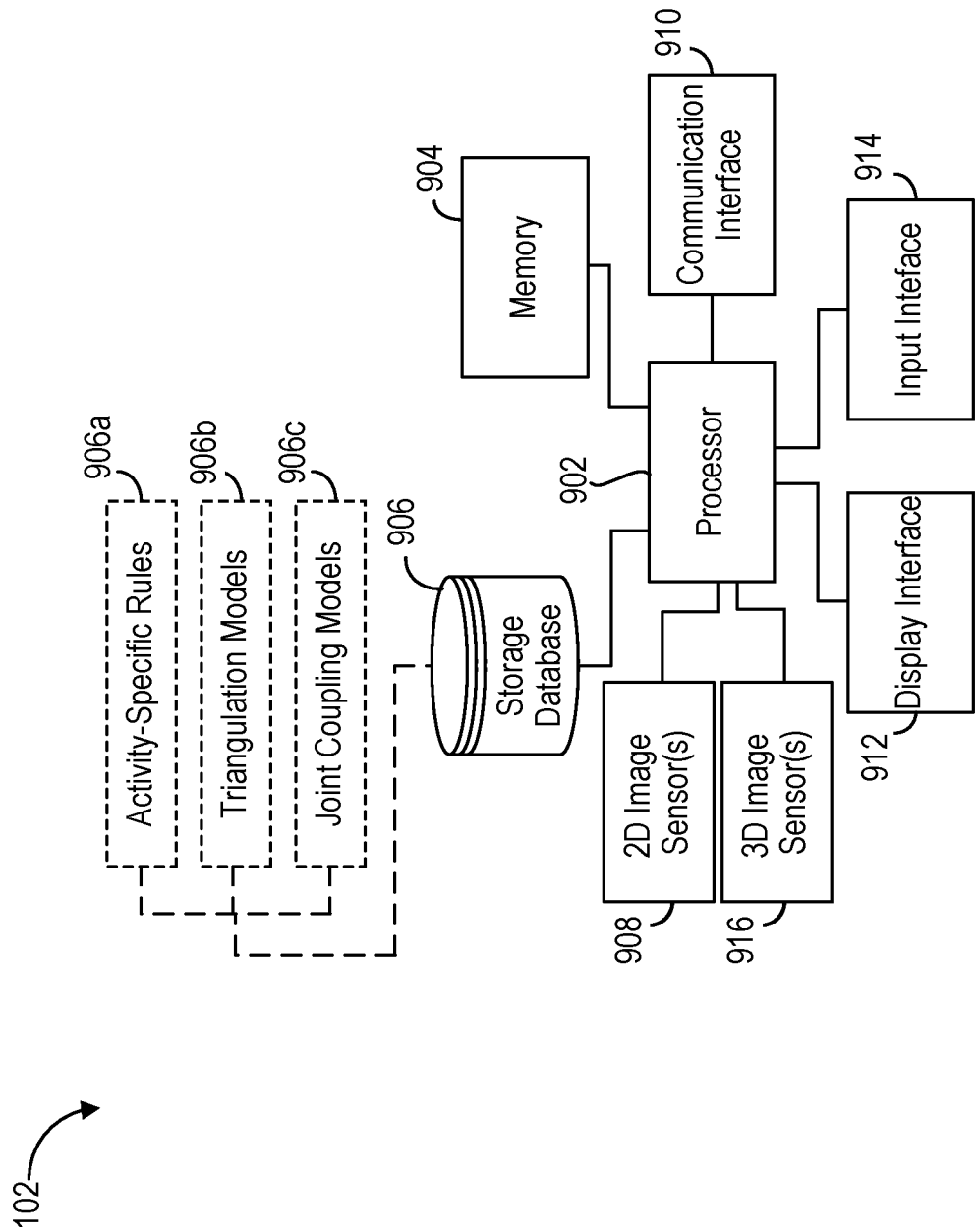
FIG. 9 is a simplified hardware/software block diagram for an example user device.

As provided below, user device (102) is equipped with a two-dimensional (2D) image sensor (908) (FIG. 9). The 2D image sensor can be, for example, a camera. The user device (102) is positioned in-front of the subject (106) to enable the 2D image sensor to capture, monitor and track the subject's motion or posture. In other examples, the user device (102) is positioned at any other location around the subject (e.g., at the side or rear).

In at least one example, the user device (102) hosts a biomechanics analysis software or application. The biomechanics application: (i) receives input 2D image frames from the 2D image sensor; and (ii) further, automatically analyzes the image frames to determine the subject's relative 3D joint positions (e.g., tri-planar joint positions).

In at least one embodiment, the biomechanics application automatically determines and tracks the subject's 3D joint positions in real-time, or near real-time. This is based on the software analyzing a real-time, or near-real time, feed of input 2D image frames generated by the 2D image sensor.

To that end, a unique feature of the disclosed methods and systems is that they enable tracking of 3D joint positions using only a single 2D camera. As discussed earlier, this is contrasted to existing systems which require 3D sensing technology, or otherwise, multiple cameras positioned around the subject. Further, as contrasted to a number of current system, the disclosed embodiments are "marker-less", and do not otherwise rely on placing markers, or other types of indicia, on or around the subject to track joint positions.

In some embodiments, the biomechanics application generates an output indicating the determined relative 3D joint positions. For example, the output is generated on a graphical user interface (GUI), of a display interface (104) of the user device (102) (FIG. 1).

Any suitable output can be generated by the biomechanics application. For example, the output can include any textual or visual elements, indicating the subject's 3D joint positions.

Figure 2A:
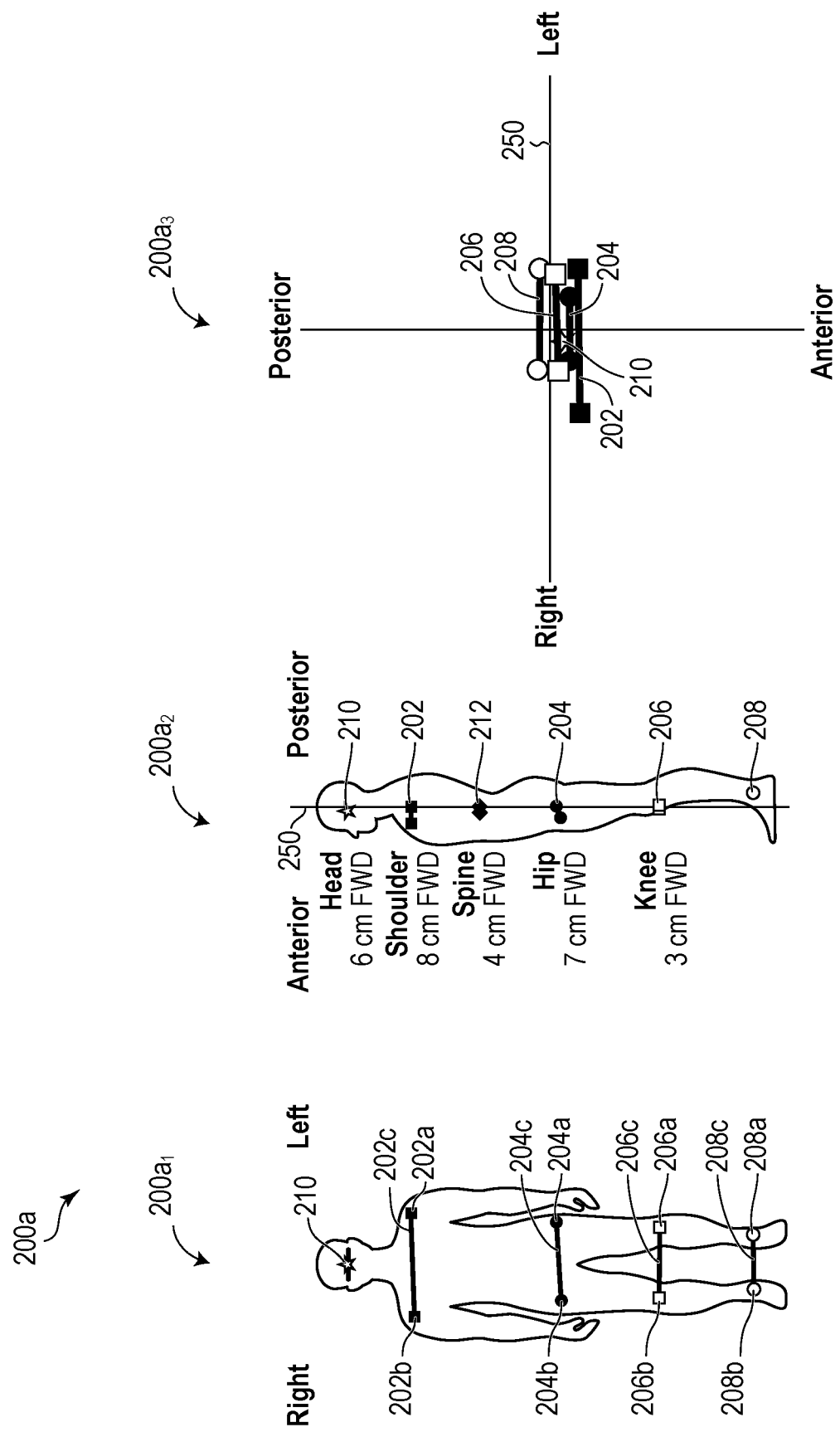
FIG. 2A are example output visualizations of three-dimensional (3D) joint positions.

FIG. 2A shows example output visualizations (200a) generated by the biomechanics application. As shown, the output visualizes the 3D position of various joints. These includes the left and right: (i) shoulder joints (202a, 202b); (ii) hip joints (204a, 204b); (iii) knee joints (206a, 206b); and (iv) ankle joints (208a, 208b). A visualization of the subject's head (210) and spine (212) may also be generated. Each of the subject's joints is visualized in all three planes, namely, the frontal plane (200a1), sagittal plane (200a2) and transverse planes (200a3).

The output visualization can also include "joint position lines" (202c)-(208c). Joint position lines (202c)-(208c) are generated to intersect common joint types. For instance, (i) position line (202c) intersects the shoulder joints, (ii) position line (204c) intersects the hip joints; and (iii) position line (206c) intersects the knee joints; and (iv) position line (208c) intersects the ankle joints. The position lines are also visualized along all three planes.

The output 3D joint positions, and joint position lines (202c)-(208c), can assist in biomechanical assessment and feedback. For instance, as the subject is performing an activity—the output visualizations update with each new generated image frame, to display the changing 3D joint positions, and position lines, as the user is moving. The 3D joint positions, and position lines, can be compared to expected 3D joint positions, and position lines to determine if the motion is being performed correctly.

Figure 2B:
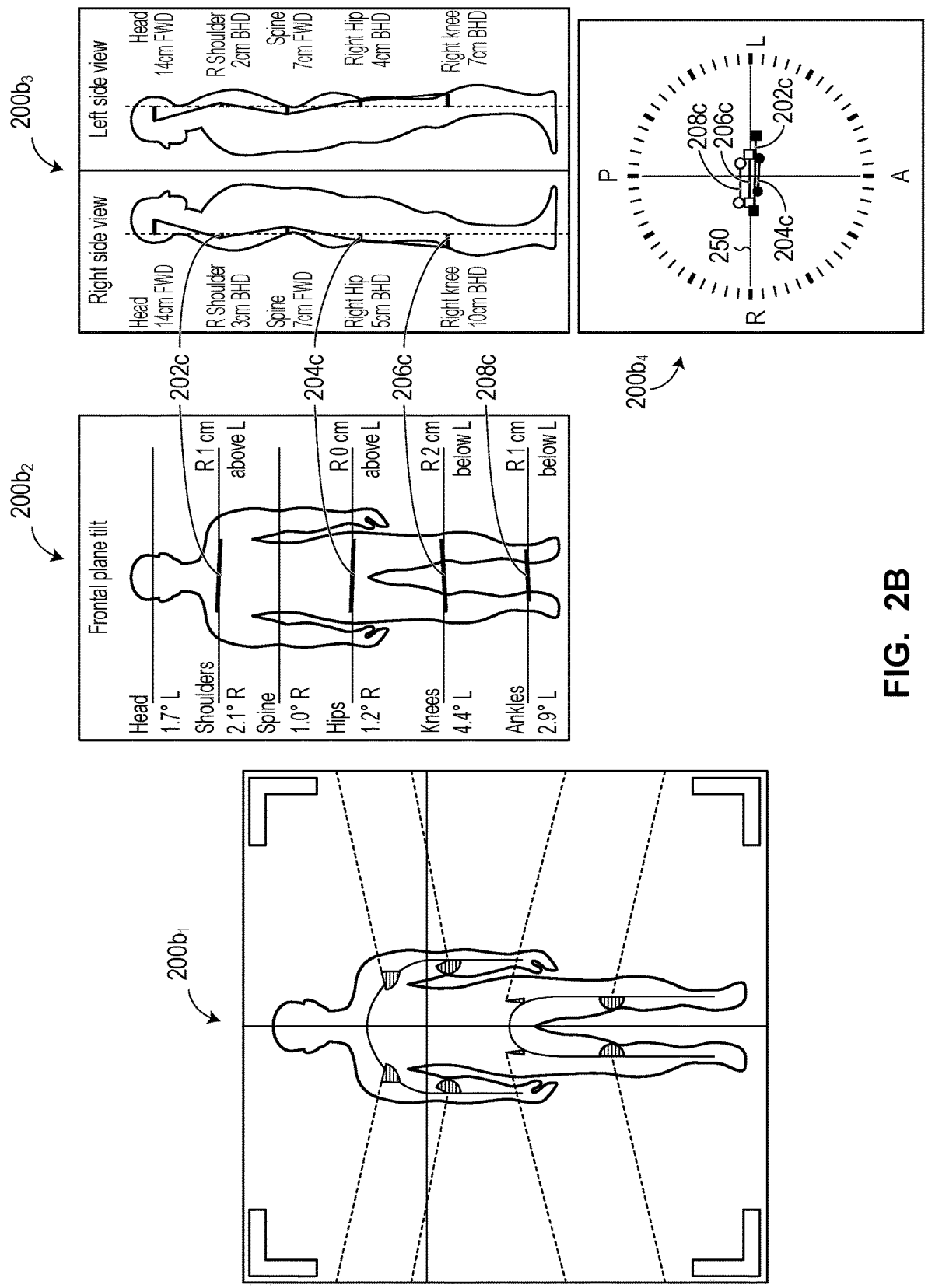
FIG. 2B is an image of a subject in a standing position, and showing output visualizations of the subject's joint positions from multiple planes and perspectives.
Figure 2C:
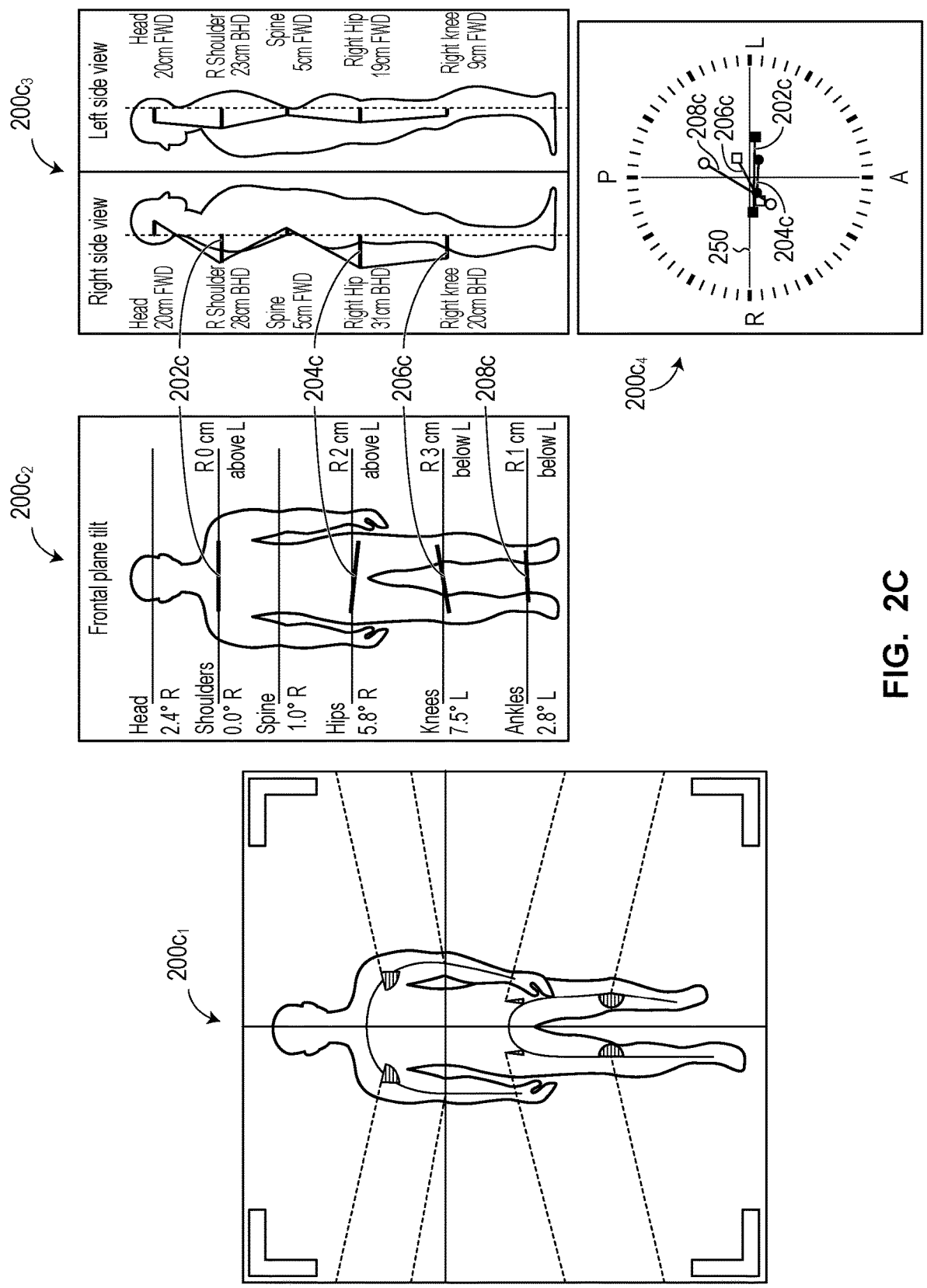
FIG. 2C is an image of a subject walking mid-stride, and showing output visualizations of the subject's joint positions from multiple planes and perspectives.

FIGS. 2B-2C exemplify the joint position lines being used for biomechanical assessment and feedback. In this example, the joint position lines (202c)-(208c) are used for gait analysis for a walking subject.

Figure 4:
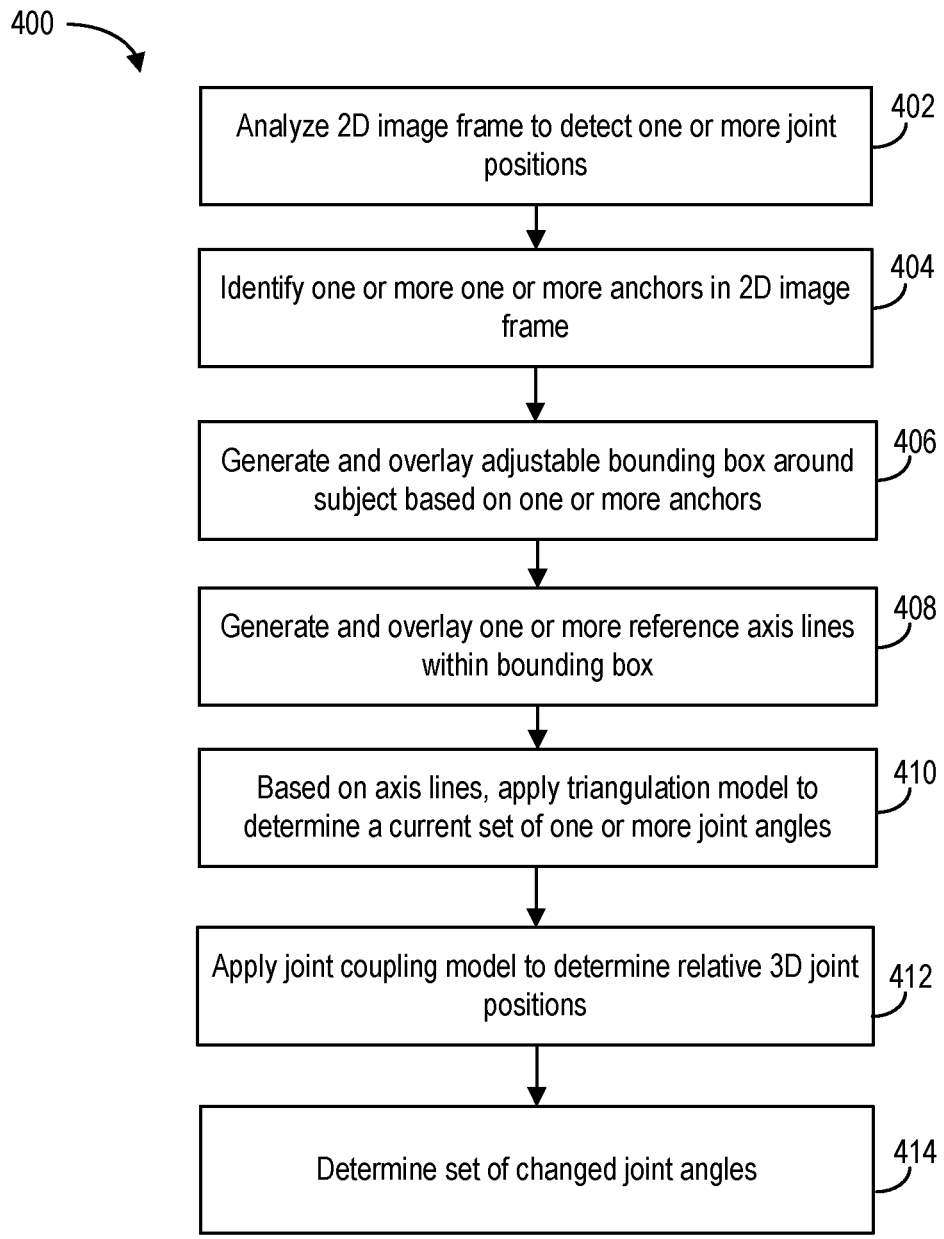
FIG. 4 is example method for tracking three-dimensional (3D) joint positions, using two-dimensional (2D) image frame data.

As shown, as the user is walking—joint position lines (202c)-(208c) rotate along the traverse plane (200b4 in FIG. 2B, and 200c4 in FIG. 2C). This is shown for a first image frame (200b1 in FIG. 2B) and a subsequent, second image frame (200c1 in FIG. 2C).

In this example, the joint lines (202c)-(208c) are analyzed to monitor the degree of rotation, between the subject's left and right legs. For example, the degree of rotation between the left and right legs is determined by monitoring rotation of one or more of the hip, knee and ankle joint lines (202c)-(208c) in the transverse plane.

For correct walking form, it is expected that the degree of rotation should be substantially equal between the left and right legs. Accordingly, if the average rotation is greater for one leg over the other—this may indicate a movement dysfunction (e.g., a valgus collapse). In some examples, the rotation of the shoulder joints is also analyzed.

A similar concept is applied to other types of physical movements (e.g., running, jumping, skating, etc.). By way of further example, in a squat—it is expected that all the joint lines (202c)-(208c) should substantially overlap, in the traverse plane, and through the entire motion of the squat. Accordingly, if it is determined the joint lines (202c)-(208c) do not substantially overlap over a portion of the squat motion, this can indicate that the squat is being performed incorrectly.

Beyond analyzing physical movements, joint position lines (202c)-(208c) are also useful for static posture analysis. For instance, FIG. 2A exemplifies a proper form for a standing position. As shown, (i) in the front plane (200a1), the joint lines (202c)-(208c) are substantially horizontal, (ii) in the sagittal plane (200a2), the joint lines (202c)-(208c) are substantially aligned along the midline axis (250); and (ii) in the transverse plane (200a4), the joint lines (202c)-(208c) substantially overlap.

In some examples, the system can also visualize the degree of tilt of various joint lines in the front plane (200b2 in FIG. 2B); as well as the degree of misalignment in the sagittal plane (200b3 in FIG. 2B).

In view of the foregoing, it is appreciated that the biomechanics application, hosted on the user device (102) (FIG. 1), can generate a wide range of outputs useful for biomechanical feedback.

II. EXAMPLE METHOD(S)

The following is a description of various examples methods for operating the systems and devices described herein.

(i.) General Example Methods

Figure 3A:
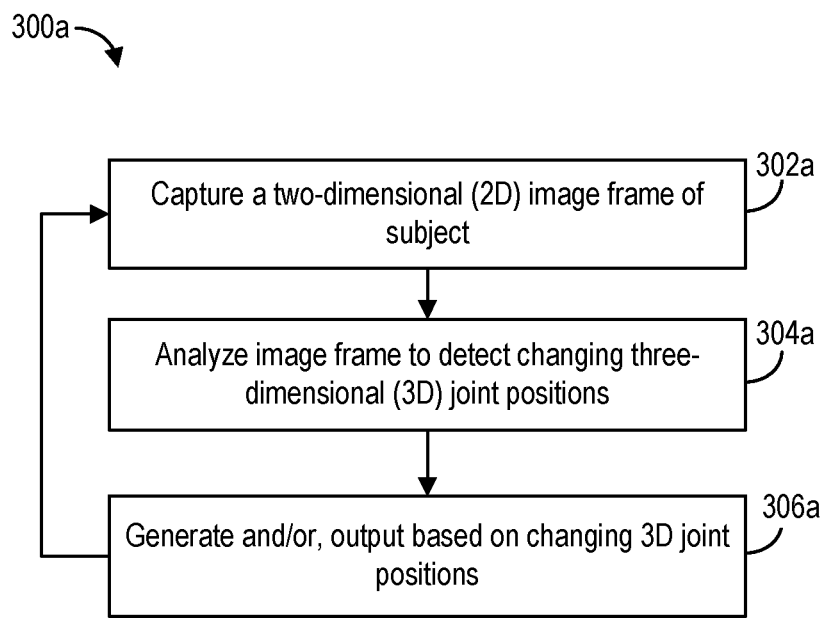
FIG. 3A is an example method for real-time, or near real-time, human joint position tracking, using a two-dimensional (2D) image sensor.

Reference is now made to FIG. 3A, which show an example method (300a) for real-time, or near real-time, human joint position tracking using a two-dimensional (2D) image sensor. Method (300a) can be performed by the user device (102).

As shown, at (302a), a 2D image frame of a subject is captured. For example, the image frame is captured by operating (e.g., by the user device processor (902) (FIG. 9)) the 2D image sensor (908) of user device (102) (FIG. 9).

Figure 6:
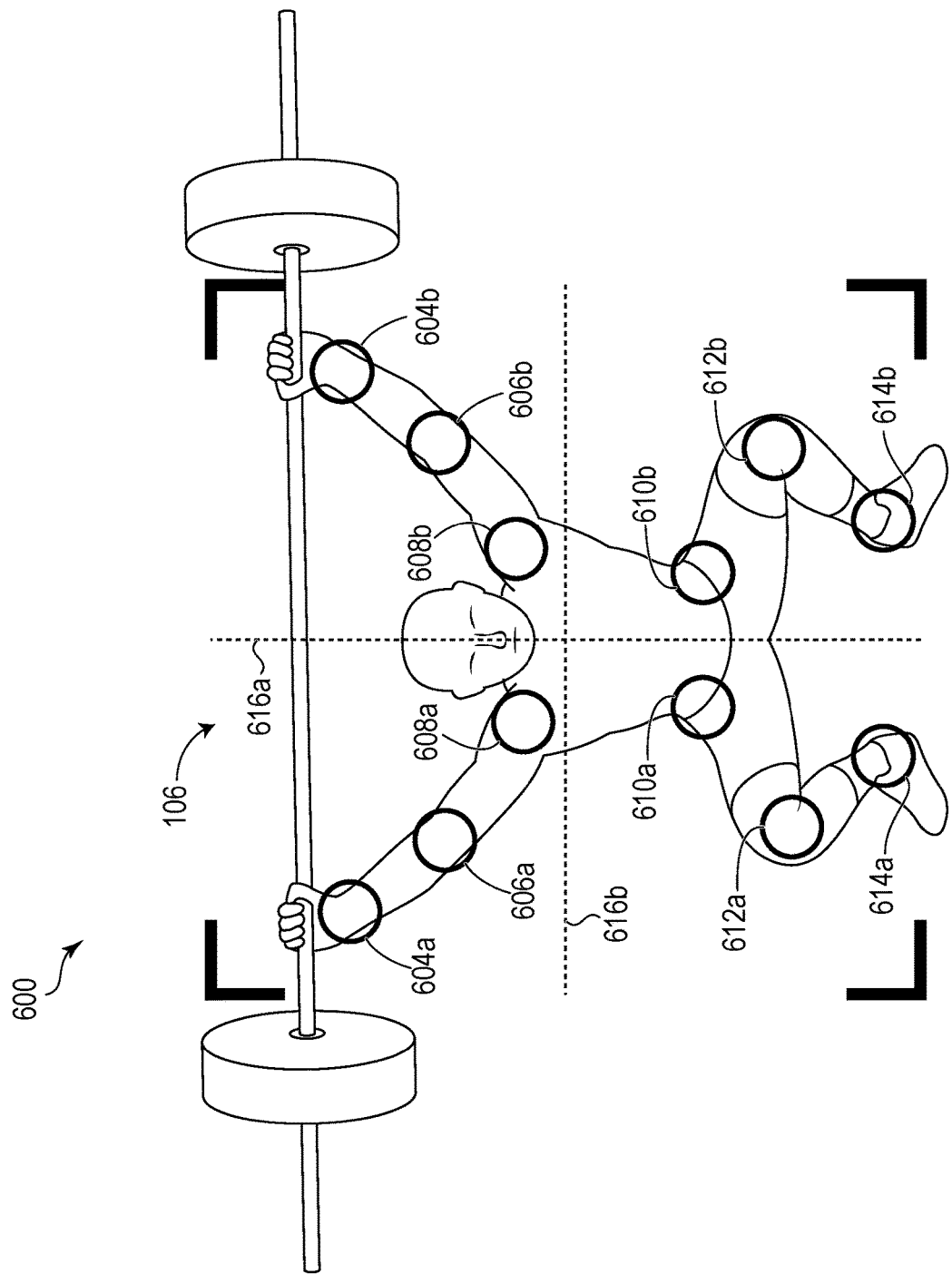
FIG. 6 is an image of a subject performing a barbell overhead squat, and illustrating detected joint positions.

In at least one example, the 2D image sensor (908) is positioned in-front of the subject, to capture a front view 2D image frame of the subject (e.g., image (600) in FIG. 6). In some examples, the frontal plane of the subject is visible (e.g., the entire front plane), in the captured image frame. To that end, the image may be captured as the subject is performing a physical activity. For instance, this can comprise an exercise, or otherwise any other physical task (e.g., lifting boxes). The image frame may also be captured while the subject is in a static position or posture.

At (304a), the input 2D image frame data is accessed and analyzed to: (i) detect image portions (e.g., image pixels) corresponding to the subject's joints; and (ii) convert two-dimensional (2D) joint positions into relative 3D joint positions, as described below in method (400) in FIG. 4. Act (304a) may be performed automatically once the image frame is captured.

At (306a), in some examples, an output is generated, or updated based on the determined relative 3D joint positions. For example, the output may correspond to a visual output on a graphical user interface (GUI), e.g., displayed on user device (102). This can include generating and displaying various 3D joint position data. As used herein, 3D joint position data can broadly include any data in respect of 3D positions of the subject's joints, including various generated joint position lines (202)-(208) as shown in FIGS. 2A-2C.

In at least one example, the output can also include various alerts, warning or notifications. For example, a notification may be generated if the 3D joint position data indicates that a physical activity is being performed incorrectly. In some examples, this may indicate a movement dysfunction. The output can also localize which joint is misplaced, in order to guide the user to correctly perform the activity.

Subsequent to act (306a), method (300a) can return to act (302a) to capture a subsequent 2D image frame of the subject performing the physical activity. For example, the subsequent image frame is captured at a second time instance, after a first-time instance in which the previous image frame is captured.

Method (300a) can then iterate for each new captured 2D image frame, and update the GUI at (306a) accordingly. In this manner, the method (300a) allows real-time, or near real-time, monitoring and/or tracking of 3D joint positions.

In some cases, it is not necessary that each new image frame captured at act (302a) is subject to acts (304a) and (306a). For example, method (300a) can iterate for every n-th image frame, where "n" is any pre-defined number.

Figure 3B:
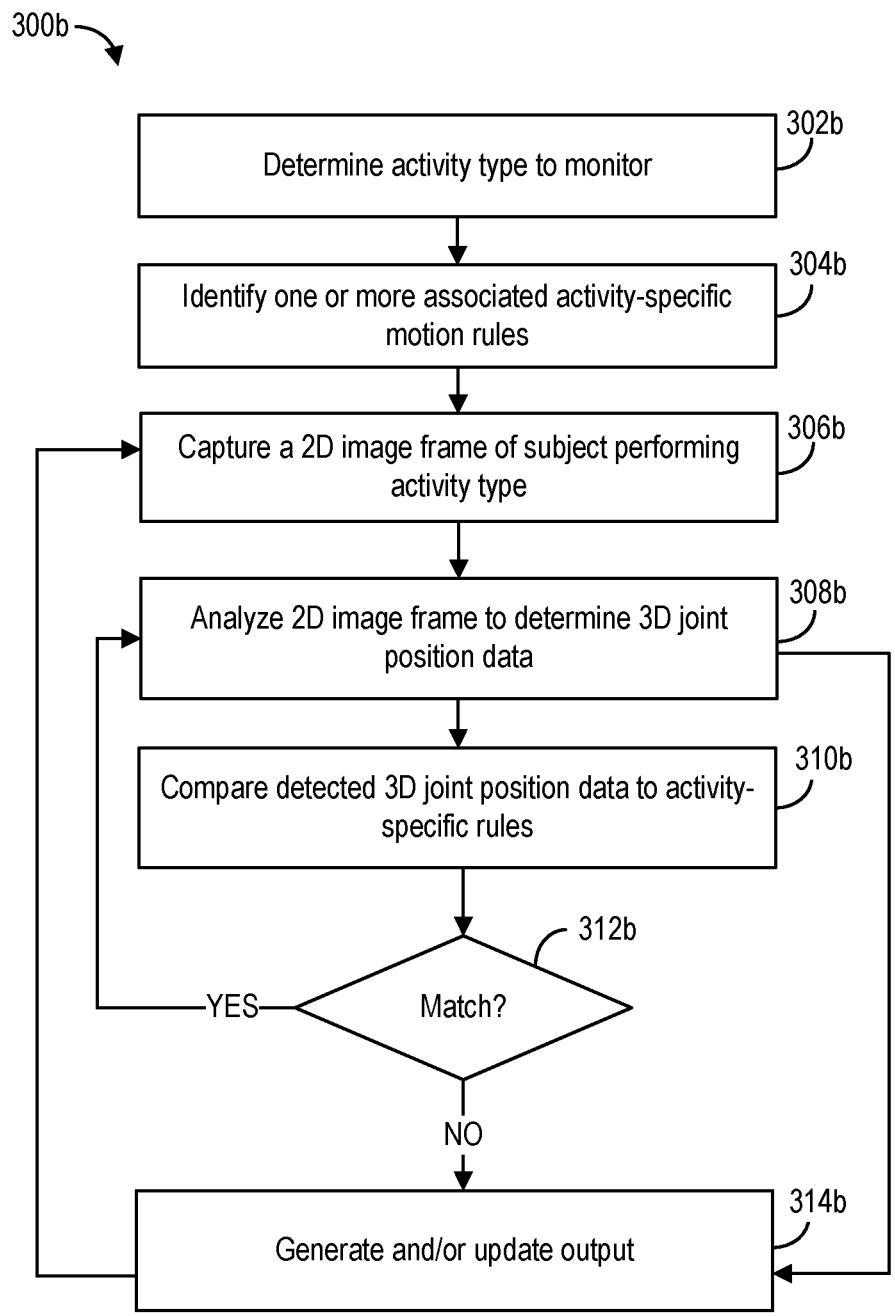
FIG. 3B is an example activity-specific application of the method of FIG. 3A.

Reference is now made to FIG. 3B, which show an example method (300b) for real-time, or near real-time, monitoring of activity performance. Method (300b) is an example application of method (300a) for monitoring performance of a specific physical activity.

Method (300b) may be performed by the processor (902), of user device (102) (FIG. 9). The processor (902) may be executing a biomechanics assessment application stored, for example, on memory (904).

As shown, at (302b), the system determines an activity type, to monitor. For example, this can relate to a specific exercise the subject is intending to perform (e.g., a squat, a deadlift, etc., can each comprise an activity type). More generally, it can also relate to any other type of dynamic human motion, or even static posture. In turn, the system can track joint positions as the subject performs that activity, to ensure the activity is performed correctly.

In at least one example, at act (302b), the activity type is input by a user. For example, a user may input the activity type into an input interface (914) of user device (102) (FIG. 9). The user device (102) may also display a number of selectable options for activity types (e.g., on display interface (912)), and the user may then select one of the available activity type options for monitoring.

In other examples, act (302*b*) may be pre-defined by the system. In other words, the system may be pre-configured to only monitor one or more activity types, e.g., with no option for user input.

At (304*b*), the system identifies, or accesses, one or more motion rules, associated with the determined activity type (also referred to herein as "activity-specific motion roles" or "activity-specific rules").

More generally, activity-specific rules identify 3D joint position data, for one or more joints, indicating a correct 3D positions of joints associated with correct performance of the selected activity type.

In some examples, the rules include reference 3D joint position data, whereby the reference data corresponds to the desired position (e.g., location and/or orientation) of individual joints and/or joint position lines, for a given activity type.

In at least one example, the 3D joint position data may be expressed relative to one or more of the frontal plane (200*a*1 in FIG. 2), sagittal plane (200*a*2 in FIG. 2A) and/or transverse plane (200*a*3 in FIG. 2A). Data may be also expressed using, for example, any coordinate system.

To this end, the activity-specific rules can correspond to a specific position of the one or more joint position lines (202*c*)-(208*c*) (FIG. 2A). For example, correct performance of a specific activity (e.g., a static posture) may require that the ankle joint line (208*c*) be angled, or non-angled, e.g., relative to the front plane (200*a*1).

The activity-specific rules can also define the position of joint position lines, relative to other joint position lines. For example, a rule may state that the ankle joint line (208*c*) should be aligned (e.g., non-angled or parallel), along the front plane (200*a*1), with the knee joint line (206*c*), e.g., along a given plane.

By way of non-limiting example, if the selected activity is a "static pose"—the rules may state that, in a static posture, joint position lines (202)-(208) should be relatively aligned (e.g., parallel) such that they are: (i) substantially horizontal in the frontal plane (200*a*1 in FIG. 2A); (ii) substantially aligned with the mid-line axis (250) in the sagittal plane (200*a*2 in FIG. 2A); and (iii) generally overlay stacked in the transverse plane (200*a*3 in FIG. 2A).

In another example, if the subject is performing a dynamic motion, the activity-specific rules may define one or more configurations for joint positions (e.g., the joint position lines) over the course of the motion.

For instance, if the activity is a "squat", the rules may require that the joint position lines (202*c*)-(208*c*) be: (i) relatively horizontal in the frontal plane throughout the entire squat movement, with minimal horizontal tilting; and (ii) generally stacked in the transverse plane (200*a*2 in FIG. 2A).

In other examples, also in relation to dynamic motion, the rules can specify an "ordered sequence" of joint position configurations. That is, the rules can define a plurality of rules, with a desired ordered sequence of these rules through time. For instance, if the activity is walking, the activity-specific rules may require, the ankle and/or knee joint lines (206*c*), (208*c*) to rotate (e.g., relative to the transverse plane (200*a*3 in FIG. 2A)) in a particular ordered sequence, as between the left and right strides. The rules can also stipulate that rotation of joint position lines (202*c*)-(208*c*) to be generally equal between the left and ride strides, as noted above.

Accordingly, in the course of executing method (300*b*), 3D joint position data is tracked to ensure that activity-specific rules are met, or satisfied. In turn, this ensures that the user is performing the activity correctly. If an activity-specific rule is not met (or satisfied), the user may be prompted to correct performance of their activity. This may minimize or limit the risk of injury when performing that activity. In some examples, the fact that the rules are not satisfied may indicate a movement dysfunction, e.g., resulting from injury.

In some embodiments, as shown in FIG. 9, the activity-specific rules at act (304*b*) (FIG. 3B) are stored on a storage database (906), of a user device (102). The storage database (906) is accessible to the biomechanics application executing method (300*b*).

In at least one example, the rules are stored in the storage database (906) as a dataset of reference rules, such as a look-up reference (e.g., a look-up table). Further, each activity type is stored in the reference dataset with its associated pre-defined activity-specific rules.

Continuing with reference to FIG. 3B, the system can begin monitoring the subject as they perform the determined activity type. Acts (306*b*) and (308*b*) are generally analogous to acts (302*a*) and (304*a*) of FIG. 3A, respectively. Namely, at (306*b*), the 2D image sensor (908) is operated (e.g., by the user device processor (902)) to capture an input 2D image frame of the subject performing the activity. At (308*b*), the 2D image frame data is automatically analyzed to determine 3D joint position data (e.g., 3D joint position location and/or 3D joint position lines configuration).

At (310*b*), the 3D joint position data is compared to the activity-specific rules, identified at (304*b*), to determine a match. For example, the determined 3D joint position data, is compared to the reference 3D joint position data associated with the activity-specific rules. That is, the 3D position of specific joints and/or joint lines, is compared to the desired (or reference) 3D position of the joints and/or joint lines, as indicated by the activity-specific rules.

In some examples, if the activity is a dynamic motion (e.g., walking), and the rules comprise an ordered sequence of rules—the determination at (310*b*) can be made with regard to that ordered sequence. That, the determination at (310*b*) can involve determining whether the determined 3D position data is correct, and with reference to the correct rule in the ordered rules.

At (312*b*), it is determined whether there is a match between the 3D joint position data and the activity-specific rules. For example, this involves determining whether the subject's motion or pose conform with the associated activity-specific rules (e.g., within a range of tolerance). In some examples, this can involve determining a difference (e.g., a Euclidian vector) between the measured and reference 3D joint positions, for corresponding joint types. In other examples, this can involve determining if the joint lines are in the correct alignment (e.g., correct joint lines are parallel along the correct plane). It can also involve comparing an angle of rotation of a given joint line to the reference joint line, e.g., with respect to a given plane.

If so, the method can return to act (306*b*) to receive and analyze the next input 2D image frame. In this manner, the method (300*b*) is able to analyze the subject's performance of the activity in real-time, or near real-time, based on real-time, or near real-time input 2D image feed.

Otherwise, at act (314b), if a match is not detected—then at (314b), output can be generated with an indication that the user is not performing the activity correctly. For example, this can involve, generating an alert notification to prompt the user to correct performance of their activity. In some examples, the GUI may also display the particulars of the activity error. For instance, the GUI can indicate that the subject needs to correct the position or alignment of their shoulder, hip or knee joints.

In some cases, act (314b) is not necessarily performed for each image frame. For example, the GUI may be updated to generate a notification, only if the difference persists over the course of several image frames (e.g., several iterations of method (300b)).

Subsequent to act (314b), the method (300b) can again return to act (306b) to capture and analyze the next 2D image frame.

In at least one embodiment, after act (308b) is performed—the graphical user interface (GUI) is also updated (e.g., in real-time, or near real-time) at act (314b), to generate an output visualization of the subject's 3D joint position data (FIGS. 2A-2C). This is performed, irrespective of whether the activity-rules are satisfied or not.

(ii.) Example Method of Tracking 3D Joint Position from input 2D Image Frame Data Reference is now made to FIG. 4, which shows an example method (400) for tracking changes in three-dimensional (3D) joint positions based on two-dimensional (2D) image data. Concurrent reference is also made to FIGS. 6-7, which provide various illustrations that exemplify different acts performed in method (400).

Method (400) is an example method performed at act (304a) of method (300a), and/or act (308b) of method (300b). Method (400) may be performed by the processor (902), of user device (102). The processor (902) may be executing the biomechanics assessment application. In various examples, method (400) is performed automatically by a processor (e.g., of user device (102)), once a 2D image frame is captured or otherwise accessed.

As shown, at (402), the input 2D image frame, captured of the subject, is analyzed to: (i) identify one or more joint types; and (ii) determine associated joint positions, in 2D, within the image frame.

For example, this involves determining image portions (e.g., image pixels) associated with different joints, and determining the joint positions (e.g., X, Y coordinates) of these image portions, relative to the image frame. In some examples, it may also involve labelling these image portions with the associated joint name or joint type. This allows identifying different the positions (or locations) of different joints.

In at least one example, the 2D image frames can also be analyzed to identify, and determine the positional location, of other body parts (e.g., sternal notch, spine and hip center).

To that end, joints (and other body parts) can be identified and located in the 2D image using any suitable image analysis technique. For example, various image analysis software is available, and known in the art, which can analyze images of human subjects, and annotate image portions corresponding to different body parts. These include, for example, software development kits (SDKs) (e.g., open-source SDKs). For instance, these include various skeleton tracking SDKs, such as the Microsoft™ Kinect™ SDK, Intel™ Cubemos™ skeletal tracking, and Apple™ ARKit. These SDKs may be stored on memory (904), of user device (102), and may be part of, or separate from, the biomechanics application. In some cases, these SDKs are able to generate a 2D skeletal model of the individual, with labelled joints, and which are overlaid (e.g., superimposed) over the 2D image frame to assist in identifying joint position.

FIG. 6 shows an image (600) of an example output of act (402). As shown, the various joint positions (604)-(614) are detected within the input 2D image frame, and in the frontal plane, along with corresponding 2D joint positions. These include: (i) the wrist joints (604a), (604b); (ii) arm joints (606a), (606b); (iii) shoulder joints (608a), (608b); (iv) hip joints (610a), (610b); (v) knee joints (612a), (612b); and (vi) ankle joints (614a), (614b).

Continuing with reference to FIG. 4, at (404), one or more anchors are detected in the 2D image frame. As explained further below, the anchors are used for generating a bounding box, at act (406). The anchors provide a static reference frame to generate a bounding box for tracking movement of the subject between consecutive 2D image frames.

In at least one example, the anchors are selected as the image portions corresponding to the ankle joints (614a), (614b) (i.e., as detected at act (402)). The ankle joints (614a), (614b) are appropriate for fixed-foot exercises (e.g., squats), as they do not change position between image frames, and thereby provide a static reference.

In other examples, as best shown in FIG. 6, the anchor is selected as the vertical mid-plane axis (616a) of the subject (e.g., axis (250) in FIG. 2A). Accordingly, in each 2D image frame, the subject's position is localized by detecting their vertical mid-plane axis (616a).

The vertical mid-plane axis (616a) can be identified, automatically, by an SDK (e.g., act (402)). It may also be identified by generating a line that intersects multiple pre-defined body portions detected at act (402) (e.g., sternal notch, spine and hip center). Alternatively, or in addition, the anchor is selected as the horizontal mid-plane axis (616b).

At (406), a bounding box (also referred to herein, interchangeably, as a "capture area") is generated and overlaid over the input 2D image frame. The bounding box defines an area or zone of the image (e.g., a boxed or rectangular area) surrounding and/or encapsulating one or more of the subject's joints—as detected at act (402)—within the 2D image frame. In some examples, the bounding box surrounds (or at least defines) the area that includes all of the subject's joints. As such, the bounding box identifies the location of the subject within the image frame.

The bounding box may be defined with at least parallel left and right lines, that are linearly vertical, and parallel top and bottom lines that are linearly horizontal.

Figure 7A:
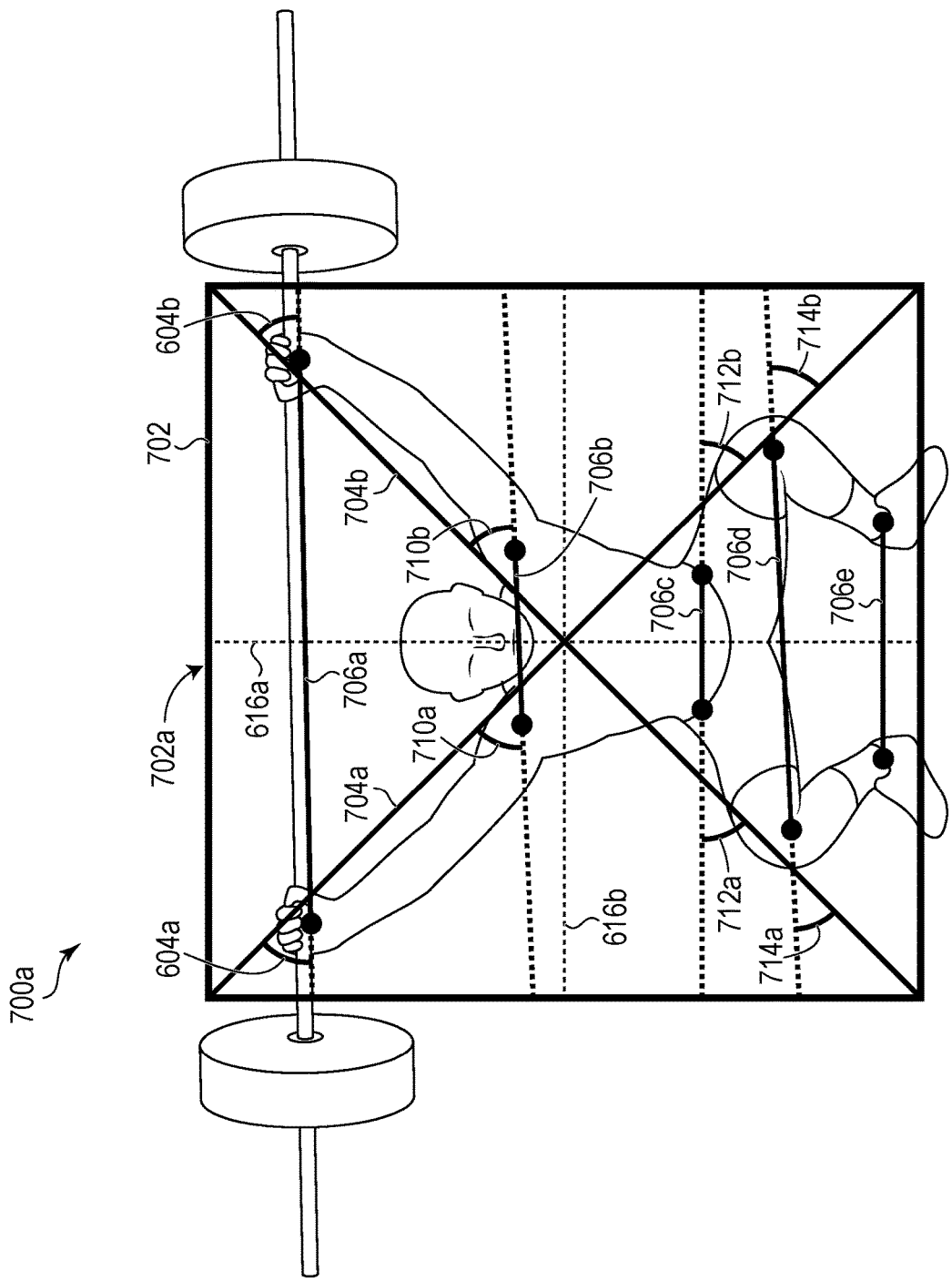
FIG. 7A is an image of a subject performing a barbell overhead squat, and illustrating an overlaid bounding box and various reference axis lines.

For example, as shown in FIG. 7A, the bounding box (702) is generated to encapsulate all of the subject's detected joints (i.e., identified as "dots" in the image frame).

As explained above, the bounding box (702) is generated with reference to the identified anchors. For example, in FIG. 7A, if the anchors are selected as the ankle joints, then the bounding box (702) is always generated such that the bottom line, of box (702), is always a pre-defined distance below (or at) the ankle joints. The box is then extended upwardly to encapsulate all of the subject's joints.

Alternatively, or in addition, if the anchor is selected as the vertical mid-plane axis (616a)—the left and right sides of the boxes are generated to be equidistant from the vertical axis (616a), and extended to encapsulate all of the subject's joints.

Here, it is appreciated that defining the anchor as the mid-plane axis (616a), at act (404), may be better suited for activities involving dynamic motion of all body parts (e.g., walking). In that case, it may be insufficient to rely only on the ankle joints (614a), (614b) as an appropriate anchor, as it distorts the location of the bounding box if the ankles are not aligned horizontally together on the ground.

Further, as explained below, at least one appreciated advantage of using a bounding box (702) is that it mitigates issues with a tilting or moving the 2D image sensor (e.g., camera).

In at least one example, irrespective of how the bounding box (e.g., capture area) is defined, it is defined in the same manner for each iteration of FIG. 4 (e.g., between consecutive image frames).

In at least one embodiment, the bounding box is an automatically "adjustable" bounding box (e.g., auto-calibrating). For example, the bounding box (702) can re-adjust in dimensions for each new image frame. This allows the bounding box (702) to re-adjust to capture the changing positions of detected joints, as between image frames of the subject.

For instance, in FIG. 7A, as the subject is performing a squat, a height dimension of the bounding box (702) is modified to accommodate the changing height of the subject throughout the squat, as between consecutive image frames of the subject performing the squat. Similarly, as the subject is walking, the height and width dimensions of the box (702) re-adjust as the subject approaches the camera, and therefore consumes a greater proportion of the image frame.

At (408), one or more reference axis lines are generated within the bounding box (702). These reference axis lines are also overlaid over the input 2D image. As provided, the reference lines allow the system to determine the relative 3D joint positions within the image frame.

Figure 7B:
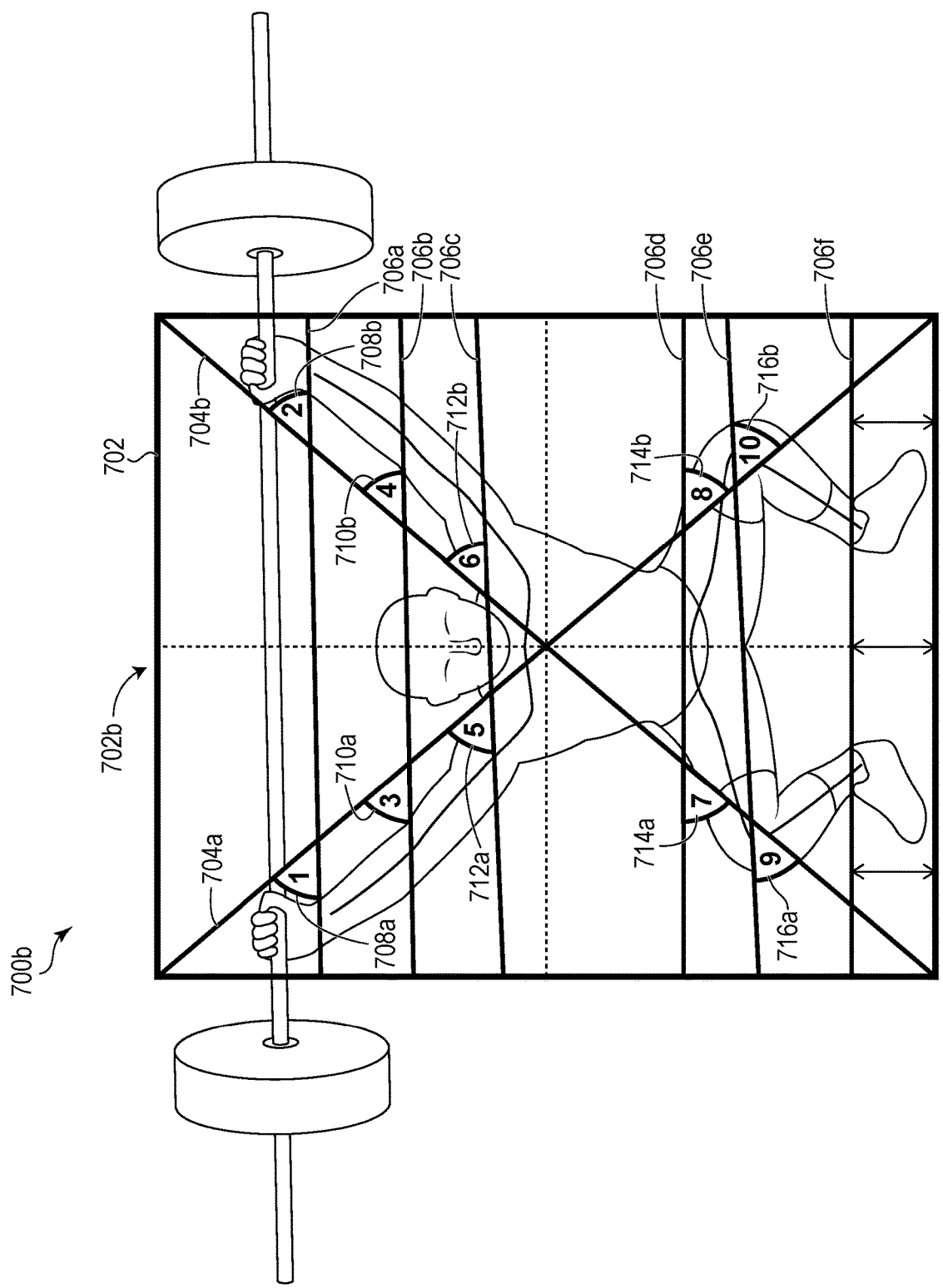
FIG. 7B is an image of a subject performing a bodyweight squat exercise, and illustrating an overlaid bounding box and various reference axis lines.

As exemplified, the reference lines can include one or more cross-diagonal axis lines (see e.g., (704a), (704b) in FIGS. 7A and 7B). The cross-diagonal axis lines (704a), (704b) are generated to intersect opposing bounding box corners. For example, first cross-diagonal reference line (704a) extends between the top-left and bottom-right corners, of box (702). Further, second cross-diagonal reference line (704b) extends between the top-right and bottom-left corners of box (702).

Reference axis lines, generated at act (408), also include one or more joint-intersecting reference lines (e.g., a plurality of joint-intersecting reference lines). In other words, reference lines that intersect similar joint types (e.g., analogous to the joint lines in FIG. 2A).

For example, as shown in FIGS. 7A and 7B, this includes: (i) a wrist-intersecting line (706a), intersecting the wrist joints; (ii) an arm-joint intersecting a line (706b), which intersects the arm joints; (iii) a hip joint intersecting axis line (706d), which intersects the hip joints; (iv) a knee joint intersecting axis line (706e), which intersects the knee joints; and/or (v) an ankle joint intersecting axis line (706f), which intersects the ankle joints. In other examples, more or less joint-intersecting reference lines may be generated for different joints, as desired for monitoring and tracking. In some examples, joint-intersecting reference lines are generated, only for the specific joints requiring monitoring for a given activity type, e.g., based on the rules at (302b).

More broadly, the joint-intersecting lines are generated to intersect the image portions (e.g., image pixels), identified as corresponding to same type joints.

As exemplified, in each case, the joint-intersecting lines (706a)-(706e) (FIG. 7B) are generated to extend between different sides of the bounding box (702). The purpose of this will become clearer shortly, below.

In other examples, it is not necessary that a bounding box is used. In some examples, the bounding box (702) is more generally referenced as a capture area (702). The capture area (702) can be defined, for example, in any other shape than a box (702). For instance, in some examples, the capture area (702) is defined between two vertical spaced lines (e.g., the right and left sides of the box, without the bottom and top horizontal lines). The height of the vertical spaced lines can extend from the bottom-most joint to the upper-most joint, and the lines can be of equal length. The cross-diagonal axis references lines are then defined, and extend between the top and bottom of opposite vertical lines. The remaining discussion will focus on the use of bounding boxes, but it will be appreciated the same concepts can be applied using the so-defined capture area.

Once act (408) is complete, a 2D image frame is overlaid with the bounding box (702) and one or more reference axis (e.g., FIGS. 7A-7B). In some examples, this can define (or generate) a modified 2D image frame.

With reference to FIG. 7B—as shown, a number of triangular areas are now defined in the 2D image frame, and within the bounding box (702). These triangles are each bounded by: (i) one of the cross-diagonal axis lines (704a), (704b); (ii) a joint-intersecting reference line (706a)-(706f); and (iii) the boundaries, of bounding box (702).

At (410), a triangulation model is applied to determine a current set of one or more joint-specific angles. For instance, in FIG. 7B, the various joint-specific angles determined include:

i. Right and Left Wrist Joint Angles (708a), (708b): Defined respectively between cross-diagonal lines (704a), (704b) and the wrist-joint intersection line (706a);

ii. Right and Left Elbow Joint Angles (710a), (710b): Defined respectively between cross-diagonal lines (704a), (704b) and the elbow-joint intersection line (706b);

iii. Right and Left Shoulder Joint Angles (712a), (712b): Defined respectively between cross-diagonal lines (704a), (704b) and the shoulder-joint intersection line (706c);

iv. Right and Left Hip Joint Angles (714a), (714b): Defined respectively between cross-diagonal lines (704a), (704b) and the hip-joint intersection line (706d); and v. Right and Left Knee Joint Angles (716a), (716b): Defined respectively between cross-diagonal lines (704a), (704b) and the knee-joint intersection line (706e).

In at least one example, each of the joint-specific angles is determined based on applying non-right angle triangle-based trigonometry computation, in accordance with Equation (1) (i.e., the "triangulation model"):

$$\frac{a}{\sin A} = \frac{b}{\sin B} = \frac{c}{\sin C} \tag{1}$$

wherein a, b, c are the lengths of the triangle sides, and A, B and C are the angles of the triangle joints.

By way of example, as shown in FIG. 7B, in order to determine the angle (710a) (i.e., right elbow joint), in Equation (1): (i) "A" may refer to the wrist-joint angle (710a); (ii) "B" may refer to the angle between the wrist-joint line (706a) and the bounding box (702); (iii) and "C"

may refer to the angle between the cross-diagonal line (704*a*) and the bounding box (702).

Additionally, (i) "a" may refer to the length of the bounding box (702), between angles "B" and "C"; (ii) "b" may refer to the length of the wrist-joint line (706*a*), between angles "A" and "B"; and (iii) and "c" may refer to the length of the cross-section line (704*a*), between angles "A" and "C".

In other examples, any other suitable method can be used to determine the joint-specific angles.

By now it will be appreciated that the bounding box (702) is important to generate the cross-diagonal reference lines (704*a*), (704*b*), which in turn, are important for determining the joint-specific angles. By ensuring that bounding box (702) is always generated with reference to fixed anchors—the angles can be determined accurately, irrespective of movement or tilting of the camera.

Referring back to FIG. 4, at (412), based on act (410)—a joint coupling model is applied to determine the relative positioning of joints, in three-dimension (3D) (e.g., in the transverse and sagittal planes).

In general, it has been appreciated that humans move in well-known "coupled motions". For example, as known, rotation of the shoulder axis is often paired with a frontal plane drop of that respective joint. Accordingly, when these coupled motions of the joint and joint axis are paired with changes to trigonometric calculations—it is possible to ascertain the relative position of the joints three-dimensionally from a 2D assessment. Examples of coupled joint patterns include, with reference to FIG. 7B:

Elbow Positioning in Transverse and Sagittal Planes:
Right Anterior Elbow is located in-front of Left Anterior Elbow if: (i) Angle (710*a*)>Angle (710*b*) and/or (ii) Angle (712*a*)>Angle (712*b*).
Left Anterior Elbow is located in-front of Right Anterior Elbow If: (i) Angle (710*b*)>Angle (710*a*) and/or (ii) Angle (712*b*)>Angle (712*a*).
Shoulder Positioning in Transverse and Sagittal Planes:
Right Anterior Shoulder is located in-front of Left Anterior Shoulder If: (i) Angle (710*a*)>Angle (710*b*) and/or (ii) Angle (712*a*)>Angle (712*b*).
Left Anterior Shoulder is located in-front of Right Anterior Shoulder If: (i) Angle (710*b*)>Angle (710*a*) and/or (ii) Angle (712*b*)>Angle (712*a*).
Hip Positioning in Transverse and Sagittal Planes:
Right Anterior Hip is located in-front of Left Anterior Hip If: (i) Angle (714*b*)>Angle (714*a*) and/or (ii) Angle (716*b*)>Angle (716*a*).
Left Anterior Hip is located in-front of Left Anterior Hip If: (i) Angle (714*a*)>Angle (714*b*) and/or (ii) Angle (716*a*)>Angle (716*b*).
Knee Positioning in Transverse and Sagittal Planes:
Right Anterior Knee is located in-front of Left Anterior Hip If: (i) Angle (716*b*)>Angle (716*a*) and/or (ii) Angle (714*b*)>Angle (714*a*).
Left Anterior Knee is located in-front of Left Anterior Hip If: (i) Angle (716*a*)>Angle (716*b*) and/or (ii) Angle (714*a*)>Angle (714*b*).

Accordingly, the system analyzes the frontal position of the adjacent joints and joint planes and determines if joints are relatively positioned in the transverse and sagittal planes, anterior or posterior, based on "joint coupling" methods. Here, it is appreciated that the system is therefore able to convert 2D positions to 3D "relative" positions, based on the "relative" angles between different joints. This, therefore, provides a computationally efficient method for tracking 3D joint positions, using only single 2D image frames.

In some embodiments, the joint coupling rules are pre-defined and stored, for example, on a storage database (906) of user device (102) (e.g., (906*c*) in FIG. 9)).

At (414), once the relative positioning of the joints are determined in the transverse and sagittal planes (i.e., act (412))—the system can determine the degree of movement change of the joints from the previous 2D image frame (e.g., in a previous iteration of method (400)). This allows determining how far the joint positions are in-front of, or behind, other joints in the transverse and sagittal plane, based on the change in relative positioning between 2D image frames.

For example, Equation (2) can be used to determine how far a joint has translated forward or backward in the transverse and sagittal planes, from a previous image frame (e.g., as determined from a previous iteration of method (400)):

$$\text{Percentage of Transverse Joint-Specific Plane Rotation} = 100 - \{[(\Delta \text{ Joint Left Primary Angle}/\Delta \text{ Joint Right Primary Angle})] \times 100\} \quad (2)$$

wherein for a specific joint (e.g., shoulder, hip, angle): (i) "Δ Joint Left Primary Angle" is the change in the joint-specific angle, for the left side joint (e.g., left shoulder), between the current image frame and the previous image frame; and (ii) "Δ Joint Right Primary Angle" is the change in the joint-specific angle, for the right side joint, between the current image frame and the previous image frame for the right side joint (e.g., right shoulder). Equation (2) can be applied accordingly for each joint type. Accordingly, the system is able to track relative motion, as between consecutive image frames.

The percentage of triangular change bilaterally—determined from Equation (2)—when comparing right to left or left to right of a respective joint group or axis is represented in the transverse and sagittal planes accordingly.

In this manner, the comparison of trigonometric change from right joint to left joint (or vice versa) paired with "paired joint coupling patterns" provides a quantitative representation of the joint positions in the transverse and sagittal planes. In turn, this allows converting the 2D joint positions into relative 3D joint position data, using a 2D image frame.

Accordingly, once the 3D joint positions are determined—it is possible to generate one or more joint position lines, that extend in 3D space (FIG. 2A). These joint position lines can be compared, for example, to activity-specific rules (see e.g., (310*b*) and (312*b*) in FIG. 3B).

III. EXAMPLE APPLICATIONS

The following is a description of various example applications of the above described methods and systems.

(I.) Real-time or Near Real-time Joint Tracking.

As noted previously, the disclosed methods enable real-time, or near real-time, 3D joint tracking and biomechanical assessment feedback, based only on a 2D image sensor.

Importantly, the real-time, or near real-time determinations are facilitated by generating a modified input image conducive to using more simplified trigonometric computational models. As contrasted to other systems, this allows the model to perform with lower processing complexity and computational processing time, and therefore generates outputs with low processing delay. The low processing delay is particular important for applications involving feedback for very fast paced movements and exercises.

(ii.) Joint Tracking Using a Single 2D Image Sensor.

As discussed previously, the disclosed methods and systems reduce, or eliminate, the requirement for 3D sensors for assessing tri-planar 3D human biomechanics. The disclosed embodiments also reduce, or eliminate, the requirement to position multiple 2D image sensors around the subject, to enable 3D tracking.

Rather, as noted above, embodiments herein enable marker-less, and tri-planer 3D analysis of human movement using only a single 2D imaging sensor. In at least one example, this solves an important problem regarding the limitations of assessing human movement in remote or virtual contexts, including telehealth assessments. The disclosed embodiments allow self-serve, or virtual biomechanics assessments using end-user devices (102) equipped only with a 2D camera.

(iii.) Detecting Hidden Joints.

Another appreciated advantages of the disclosed embodiments is that they enable tracking joint positions—even when some joints are blocked or visually obfuscated. For example, a joint may be visually blocked because part of the subject's body is not visible within the 2D image frame (e.g., the subject is partially hidden behind a wall, etc.).

In more detail, it is possible to rely on the joint coupling rules, at act (412), to determine the position of an obstructed joint, based on the known position of a non-obstructed joint.

For example, the relative position of the elbow joints (i.e., in the transverse and sagittal planes) can be determined based on coupling rules with shoulder joints (e.g., angles (712a), (712b) in FIG. 7B, and as noted above). For instance, if one or more of the elbow joints is out-of-view, the system can still predict relative forward/rearward elbow joint position location based on the relative shoulder joint positions. This is contrasted to existing systems, in which the system cannot operate to track joint positions, unless all joints are visible within the image frame.

(iv.) Enhancing Motion Capture Using 3D Sensors

In at least one example application, the described embodiments may also be used to enhance the accuracy of human motion capture using conventional three-dimensional (3D) sensors.

Figure 5:
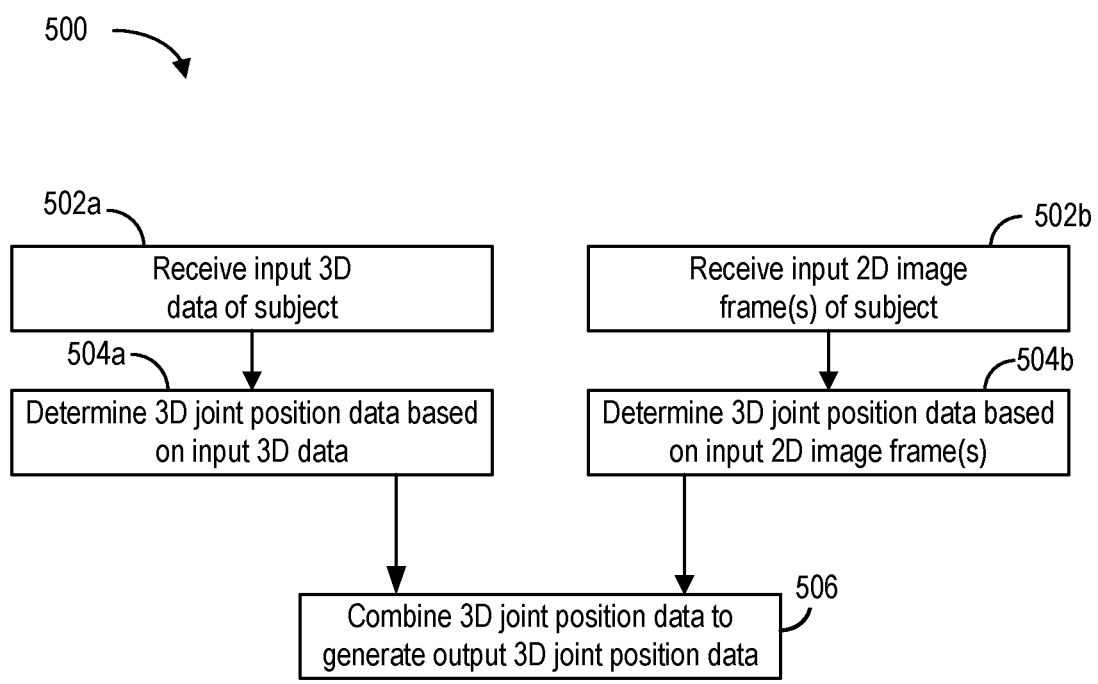
FIG. 5 is an example method for joint position tracking using a 2D image sensor to enhance joint position tracking using a 3D image sensor.

Reference is now made to FIG. 5, which shows an example method (500) for using a combination of 2D and 3D sensors for real-time, or near real-time, joint position tracking.

As shown, at (502a), the system can receive input 3D data for a subject performing an activity. The input 3D data may be generated by a 3D sensor. For example, the user device (102) may include 3D sensors, which are operated to capture the input 3D data (i.e., by the processor). The 3D sensors may be, for instance, light detection and ranging (LiDAR) sensors, other depth sensors, or the like. In some examples, the input 3D sensor data comprises point cloud data.

At (502b), concurrently to act (502a), the system also receives input 2D image frame data of the subject performing the activity. The 2D image frame data is generated by a 2D image sensor (908), of the user device (102). For example, the user device (102) can operate the 2D image sensor (908) to capture input 2D image frame data.

At (504a) and (504b), the system determines 3D joint position data by analyzing the input 3D data (504a), and the input 2D image frame(s) data (504b).

Act (504b) may be performed using method (400) of FIG. 4. Further, act (504a) is performed using any suitable technique to determine 3D joint position data, based on input 3D data.

At (506), the 3D position data, generated from (504a) and (504b,) are combined to generate output 3D position data.

Various methods can be used to combine the 3D position data from (504a) and (504b). For instance, in some examples, the system can average the 3D position data, from each of the 3D and 2D sensors. In other examples, the system initially relies on the joint position data (504a) generated by the 3D sensors, and only accounts for 2D sensor data if there is an anomaly in the 3D sensor data. For example, the system can monitor if the 3D joint position data experiences a sudden change (e.g., spike) in any of the axis or planes, within a predefined time period. If so, this indicates a sudden unnatural change in position of a given joint. Accordingly, in that case, the system may average the 3D joint position—for that joint—generated by the 3D sensor (504a) and 2D sensor (504b), to smoothen the output position data. As such, the 2D sensor data is used to smooth positional spikes, and remove outlier data.

In other examples, the system may also compare the 3D joint position determined (504a) and (504b). For example, the system can determine a difference between the two determined 3D joint positions, from each sensor. If the difference is above a pre-determined threshold, the system can either average the two 3D joint positions, or rely on the 3D joint positions determined from the 2D image sensor.

Accordingly, in these examples, the joint position data from the 2D sensors enhances the accuracy of the position data generated by 3D sensors.

To that end, at least one appreciated advantage of this method is that the 2D sensors can also enhance output for the 3D sensors for hidden joints based on joint coupling rules, as described previously.

In examples where 3D sensor data is used (FIG. 5), this data can also be used to determine acts (308b)-(314b) (FIG. 3B).

(v.) Golfing Applications.

In some examples, the disclosed systems and methods can be used in golfing applications. For example, the activity type, at (302b) in FIG. 3B, can be a golf swing. Accordingly, at (304b), one or more activity-specific rules may be accessed, associated with the proper ordered sequence of joint position movements, for a good form golf swing. For example, these activity-specific rules can reflect proper shoulder abduction/adduction, and spine rotation.

IV. OTHER EXAMPLE EMBODIMENTS

The following is a description of other example embodiments for methods and systems described herein. The following embodiments may be used in alternative to and/or in addition to, the embodiments described thus far.

(I.) Non Real-Time Analysis.

While embodiments herein have so far been described in relation to real-time, or near real-time assessment—it will be understood that the same methods can be applied for non-real-time assessment.

For example, method (300a) (FIG. 3A) and method (300b) (FIG. 3B) can be used to analyze videos of subjects (e.g., 2D videos) captured in a previous instance in time. For example, a plurality of 2D images frames of a subject performing a physical activity (e.g., exercise) can be captured. The 2D image frames can be stored in the memory of the user device (e.g., as a video file). At a subsequent point in time, the biomechanical assessment application, operating on user device (102), can retrieve and access the 2D image frames to perform an analysis. In these examples, acts (304a) (FIG. 3A) and act (306b) (FIG. 3B) would comprise accessing (e.g., retrieving from memory) a 2D image frame of a subject, rather than capturing the image frame.

By a similar token, with reference to method (600) (FIG. 6), the input 3D data may also be stored for later analysis by a biomechanical assessment application.

(ii.) Other Example Systems

The methods described herein exemplify the 2D image sensor as being included in the user device (102). Further, the methods are described as being performed by the processor (902) of user device (102).

However, in other examples embodiments, the described methods can also be distributed between multiple computing devices. For example, rather than using a 2D image sensor of a user device (102), the 2D image sensor may be a stand-alone device.

FIG. 8 shows an example system (800) for human motion capture, that includes a user device (102), coupled via network (810), to one or more of a cloud server (802) and remote computer terminal (804).

In these examples, the methods described herein (i.e., FIGS. 3-5) can be performed by one or more of the user device (102), computer terminal (804) and cloud server (802).

For example, the user device (102) may capture the input 2D image data (and/or input 3D data). The user device (102) may then communicate the raw or partially processed input data to one or more of the server (802) and the remote terminal (804). The server (802) and/or remote terminal (804) may then host the biometric assessment software, which performs the methods in FIGS. 3-5, to determine 3D joint position data. The 3D joint position data may be stored and/or output on the server (802) and/or remote terminal (804). In other cases, the 3D joint position data is transmitted back to the user device (102) for output.

In other examples, the 3D joint position data may be determined on the user device (102) itself, and subsequently transmitted to one or more of the server (802) and/or remote terminal (804) for storage and/or output.

In some examples, in addition or in the alternative to storing a biomechanical assessment application—the server (802) and/or computer terminal (804) can store one or more of the activity-specific rules (906a), triangulation models (906b) and joint coupling models (906c) (FIG. 9). The server (802) and/or computer terminal (804) can also store previously captured 2D image frames and/or 3D data, for non-real-time analysis, as described above.

In some examples, the biomechanics application is distributed between, and stored in multiple of the computing devices such that different devices perform different parts of the described methods.

To that end, system (800) can be suited, for example, for tele-health or remote assessments. For instance, a biomechanics assessment practitioner may operate the remote terminal (804), while a patient operates the user device (102). The patient may perform prescribed activities (e.g., exercises), while the output of the biomechanical assessment application is generated on one or more of the remote terminal (804) and/or user device (102). In this manner, the practitioner is able to monitor and provide feedback to the patient remotely, or virtually.

In system (800), network (810) may be connected to the internet. Typically, the connection between network (810) and the Internet may be made via a firewall server (not shown). In some cases, there may be multiple links or firewalls, or both, between network (810) and the Internet. Some organizations may operate multiple networks (810) or virtual networks (810), which can be internetworked or isolated. These have been omitted for ease of illustration, however it will be understood that the teachings herein can be applied to such systems. Network (810) may be constructed from one or more computer network technologies, such as IEEE 802.3 (Ethernet), IEEE 802.11 and similar technologies.

V. Example Hardware Environment

Reference is now made to FIG. 9, which shows an example simplified hardware/software block diagram for a user device (102). While not explicitly shown, the server (802) and remote terminal (804) may have analogous architectures.

As shown, the user device (102) generally includes a processor (902) coupled to one or more of a memory (904), a storage database (906), one or more 2D image sensor(s) (908), a communication interface (910), a display interface (912), a user input interface (914). In some examples, the user device (102) may also include one or more 3D image sensors (916).

Processor (902) is a computer processor, such as a general purpose microprocessor. In some other cases, processor (902) may be a field programmable gate array, application specific integrated circuit, microcontroller, or other suitable computer processor. In some cases, processor (902) may comprise multiple processors, such that is referenced as at least one processor (902).

Processor (902) is coupled, via a computer data bus, to memory (904). Memory (904) may include both volatile and non-volatile memory. Non-volatile memory stores computer programs consisting of computer-executable instructions, which may be loaded into volatile memory for execution by processor (902) as needed.

It will be understood by those of skill in the art that references herein to user device (102) as carrying out a function or acting in a particular way imply that processor (902) is executing instructions (e.g., a software program) stored in memory (904) and possibly transmitting or receiving inputs and outputs via one or more interfaces. Memory (904) may also store data input to, or output from, processor (902) in the course of executing the computer-executable instructions.

As noted above, memory (904) may store various applications, including one or more applications for performing the methods in FIGS. 3-5 (e.g., biomechanical assessment application(s)). Memory (904) can also store various software development kits (SDKs) and other programs, which can be used to detect 2D joint position in images, as well as determine output 3D joint position data from input 3D data.

Storage database (906) may be configured as a relational database. In other embodiments, database (906) may be a non-relational database, such as a key-value database, NoSQL database, a graph database, or the like. In some cases, database (906) may be formed from a mixture of relational and non-relational databases.

As shown, storage database (906) may store one or more of the activity-specific rules (906a), triangulation models (906b) and/or joint coupling models (906c).

In other examples, the storage database (906) may partially or fully integrated with the memory (904).

Two-dimensional (2D) image sensor(s) (908) can comprise any sensors capable of capturing 2D images. For example, this can include any type of camera, or the like (e.g., RGB cameras).

Communication interface (910) is one or more data network interface, such as an IEEE 802.3 or IEEE 802.11 interface, for communication over a network.

Display interface (912) is a suitable display for outputting information and data as needed by various computer programs.

Input interface (914) may be, for example, a keyboard, mouse, etc. In some cases, display (912) may act as an input interface (914) where the display (912) is a touch-screen display (e.g., a capacitive touchscreen display).

Three-dimensional (3D) image sensor(s) (916) can comprise any sensors capable of capturing 3D data. For example, this can include various types of depths sensors, including LiDAR sensors, as known in the art.

VI. Interpretation

Various systems or methods have been described to provide an example of an embodiment of the claimed subject matter. No embodiment described limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described is not an embodiment that is recited in any claimed subject matter. Any subject matter disclosed in a system or method described that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. As used herein, two or more components are said to be "coupled", or "connected" where the parts are joined or operate together either directly or indirectly (i.e., through one or more intermediate components), so long as a link occurs. As used herein and in the claims, two or more parts are said to be "directly coupled", or "directly connected", where the parts are joined or operate together without intervening intermediate components.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming or script-based programming. Accordingly, the program code may be written in Java, Swift/Objective-C, C, C++, Javascript, Python, SQL or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage. The computer program product may also be distributed in an over-the-air or wireless manner, using a wireless data connection.

The term "software application" or "application" refers to computer-executable instructions, particularly computer-executable instructions stored in a non-transitory medium, such as a non-volatile memory, and executed by a computer processor. The computer processor, when executing the instructions, may receive inputs and transmit outputs to any of a variety of input or output devices to which it is coupled. Software applications may include mobile applications or "apps" for use on mobile devices such as smartphones and tablets or other "smart" devices.

A software application can be, for example, a monolithic software application, built in-house by the organization and possibly running on custom hardware; a set of interconnected modular subsystems running on similar or diverse hardware; a software-as-a-service application operated remotely by a third party; third party software running on outsourced infrastructure, etc. In some cases, a software application also may be less formal, or constructed in ad hoc fashion, such as a programmable spreadsheet document that has been modified to perform computations for the organization's needs.

Software applications may be deployed to and installed on a computing device on which it is to operate. Depending on the nature of the operating system and/or platform of the computing device, an application may be deployed directly to the computing device, and/or the application may be downloaded from an application marketplace. For example, user of the user device may download the application through an app store such as the Apple App Store™ or Google™ Play™.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A method for human motion capture, comprising:
analyzing a two-dimensional (2D) image frame of a subject to detect one or more image portions corresponding to the subject's joints;
defining a capture area based on one or more pre-defined anchors, identified in the image frame,
wherein the capture area defines an image area surrounding the one or more image portions of the subject's joints, and the capture area defines at least left and right parallel vertical lines;
generating one or more reference axis lines within the capture area, and which intersect the vertical lines;
determining one or more joint-specific angles generated by the intersection of the one or more reference axis lines, with the vertical lines;
based on the determined joint-specific angle values, applying a joint coupling model to the determine relative joint positions, of the subject's joints, in a transverse and sagittal planes; and
generating an output indicating three-dimensional (3D) joint position data for the subject's joints.

2. The method of claim 1, further comprising:
initially, operating a two dimensional (2D) image sensor to capture the input 2D image frame.

3. The method of claim 1, wherein the method is performed in real-time, or near real-time, based on a real-time or near real-time input feed of 2D image frames.

4. The method of claim 1, wherein the one or more pre-defined anchors comprise one or more of:
the image portions corresponding to the ankle joints; and
a detected vertical midline axis of the subject.

5. The method of claim 1, wherein the capture area is a re-adjustable bounding box that further includes parallel horizontal lines connecting the vertical lines.

6. The method of claim 1, wherein the output comprises a graphical output of three-dimensional (3D) joint position data in one or more of the frontal, transverse and sagittal planes.

7. The method of claim 1, wherein the method further comprises:
initially identifying one or more activity-specific rules, corresponding to a selected activity type;
comparing the output 3D joint position data to the one or more activity-specific rules to determine a match; and
if there is no match, generating the output to indicate that the activity type is performed incorrectly.

8. The method of claim 1, wherein the one or more reference axis lines comprise:
(a) one or more cross-diagonal axis lines, extending between the vertical lines; and
(b) one or more joint-intersecting lines, extending and intersecting image portions corresponding to same joint types.

9. The method of claim 8, wherein the one or more reference axis lines generate a plurality of triangular areas within, each triangular area being associated with a corresponding joint-specific angle, and wherein determining one or more joint-specific angles involves applying a triangulation model to the triangular areas.

10. The method of claim 1, further comprising comparing a change of joint-specific angles between the opposite joints, as between subsequent 2D image frames, to determine a change of movement in the transverse and sagittal planes.

11. The method of claim 1, wherein the output 3D joint position data comprises first output 3D joint position data, and the method further comprising:
initially, operating a three dimensional (3D) image sensor to capture the one or more input 3D image data;
analyzing input 3D image data to determine second output 3D joint position data, wherein the input 3D image data is captured of the subject concurrently with the input 2D image frames; and
combining the first and second output 3D joint position data to generate a combined output 3D joint position data.

12. A system for human motion capture, comprising:
a two-dimensional (2D) image sensor; and
at least one processor coupled to the 2D image sensor, and configured for:
analyzing a two-dimensional (2D) image frame of a subject, captured by the 2D image sensor, to detect one or more image portions corresponding to the subject's joints;
defining a capture area based on one or more pre-defined anchors, identified in the image frame,
wherein the capture area defines an image area surrounding the one or more image portions of the subject's joints, and the capture area defines at least left and right parallel vertical lines;
generating one or more reference axis lines within the capture area, and which intersect the vertical lines;
determining one or more joint-specific angles generated by the intersection of the one or more reference axis lines, with the vertical lines;
based on the determined joint-specific angle values, applying a joint coupling model to the determine relative joint positions, of the subject's joints, in a transverse and sagittal planes; and generating an output indicating three-dimensional (3D) joint position data for the subject's joints.

13. The system of claim 12, wherein the one or more pre-defined anchors comprise one or more of:
the image portions corresponding to the ankle joints; and
a detected vertical midline axis of the subject.

14. The system of claim 12, wherein the capture area is a re-adjustable bounding box that further includes parallel horizontal lines connecting the vertical lines.

15. The system of claim 12, wherein the output comprises a graphical output of three-dimensional (3D) joint position data in one or more of the frontal, transverse and sagittal planes.

16. The system of claim 12, wherein the at least one processor is further configured for:
initially identifying one or more activity-specific rules, corresponding to a selected activity type;
comparing the output 3D joint position data to the one or more activity-specific rules to determine a match; and
if there is no match, generating the output to indicate that the activity type is performed incorrectly.

17. The system of claim 12, wherein the one or more reference axis lines comprise:
(a) one or more cross-diagonal axis lines, extending between the vertical lines; and
(b) one or more joint-intersecting lines, extending and intersecting image portions corresponding to same joint types.

18. The system of claim 17, wherein the one or more reference axis lines generate a plurality of triangular areas within, each triangular area being associated with a corresponding joint-specific angle, and wherein determining one or more joint-specific angles involves applying a triangulation model to the triangular areas.

19. The system of claim 12, wherein the at least one processor is further configured for:
comparing a change of joint-specific angles between the opposite joints, as between subsequent 2D image frames, to determine a change of movement in the transverse and sagittal planes.

20. The system of claim 12, wherein the output 3D joint position data comprises first output 3D joint position data, and the system further comprises a three-dimensional (3D) image sensor coupled to the at least one processor, and the at least one processor is further configured for:
initially, operating the 3D image sensor to capture the one or more input 3D image data;
analyzing input 3D image data to determine second output 3D joint position data, wherein the input 3D image data is captured of the subject concurrently with the input 2D image frames; and
combining the first and second output 3D joint position data to generate a combined output 3D joint position data.

* * * * *